United States Patent
Basu

(10) Patent No.: US 11,586,765 B2
(45) Date of Patent: Feb. 21, 2023

(54) BLOCKCHAIN BASED PRIVACY COMPLIANCE PLATFORM

(71) Applicant: 0Chain, LLC, Cupertino, CA (US)

(72) Inventor: Saswata Basu, Cupertino, CA (US)

(73) Assignee: OCHAIN, LLC, Cupertino, CA (US)

( * ) Notice: Subject to any disclaimer, the term of this patent is extended or adjusted under 35 U.S.C. 154(b) by 203 days.

(21) Appl. No.: 17/119,636

(22) Filed: Dec. 11, 2020

(65) Prior Publication Data

US 2021/0182422 A1    Jun. 17, 2021

Related U.S. Application Data

(63) Continuation-in-part of application No. 16/027,248, filed on Jul. 3, 2018, now Pat. No. 10,986,177.
(Continued)

(51) Int. Cl.
*G06F 21/62* (2013.01)
*H04L 9/32* (2006.01)
(Continued)

(52) U.S. Cl.
CPC ...... *G06F 21/6245* (2013.01); *G06F 16/2379* (2019.01); *G06F 21/602* (2013.01);
(Continued)

(58) Field of Classification Search
CPC ............ G06F 21/6245; G06F 16/2379; G06F 21/602; G06F 21/33; G06F 21/64;
(Continued)

(56) References Cited

U.S. PATENT DOCUMENTS 9,875,510 B1    1/2018 Kasper
11,023,318 B1 * 6/2021 Volkov ................ G06F 16/1805
(Continued)

FOREIGN PATENT DOCUMENTS

JP    2017504856 A  *  2/2017

OTHER PUBLICATIONS

Rob Glenn and Stephen T. Kent, The Null Encryption Algorithm and its Use with ipsec, JOUR: RFC2410, https://www.rfc-editor.org/rfc/rfc2410.txt, Nov. 1, 1998, pp. 1-6, V 2410, The Internet Society.
(Continued)

*Primary Examiner* — Kambiz Zand
*Assistant Examiner* — Aubrey H Wyszynski
(74) *Attorney, Agent, or Firm* — Levine's Tech Consulting LLC; Frank E. Levine

(57) ABSTRACT

Disclosed herein is a storage platform for managing privacy compliance in an organization. The storage platform comprises a plurality of storage servers and at least one storage controller. The at least one storage controller receives user data from a user associated with the organization and splits the user data into a plurality of data chunks. Further, each data chunk of the plurality of data chunks are stored on a separate storage server selected from the plurality of storage servers. Also, each of the plurality of data chunks are encrypted using encryption keys stored on a distributed ledger. Thereafter, an authentication token corresponding to
(Continued)

the stored user data is generated and provided to the user to enable the user to securely share the stored user data with the organization.

28 Claims, 18 Drawing Sheets

Related U.S. Application Data

(60) Provisional application No. 62/707,177, filed on Oct. 24, 2017.

(51) Int. Cl.
*H04L 9/14* (2006.01)
*H04L 9/30* (2006.01)
*G06F 16/23* (2019.01)
*H04L 9/06* (2006.01)
*G06F 21/60* (2013.01)
*H04L 9/00* (2022.01)

(52) U.S. Cl.
CPC .............. *H04L 9/0637* (2013.01); *H04L 9/14* (2013.01); *H04L 9/30* (2013.01); *H04L 9/3213* (2013.01); *H04L 9/50* (2022.05)

(58) Field of Classification Search
CPC . H04L 9/0637; H04L 9/14; H04L 9/30; H04L 9/3213; H04L 9/50; H04L 2209/56; H04L 9/0841; H04L 9/3239; H04L 9/3297; H04L 63/123; H04L 63/1466; G06Q 20/223; G06Q 20/06
USPC ........................................................ 713/159
See application file for complete search history.

(56) References Cited

U.S. PATENT DOCUMENTS

| | | |
|---|---|---|
| 2018/0152289 A1 | 5/2018 | Hunt et al. |
| 2018/0276626 A1 | 9/2018 | Laiben et al. |
| 2019/0378069 A1 | 12/2019 | Deshpande et al. |
| 2021/0288946 A1* | 9/2021 | Borzov ................. H04L 9/3213 |

OTHER PUBLICATIONS

Ralph C Merkle, A Digital Signature Based on a Conventional Encryption Function. In: Pomerance C. (eds) Advances in Cryptology—Crypto '87. Crypto 1987. Lecture Notes in Computer Science, 1988 volume 293, pp. 369-378, Springer-Berlin, Heidelberg, London, UK.

Satoshi Nakamoto, Bitcoin: A Peer-to-peer Electronic Cash System, URL: http//www.bitcoin.org/bitcoin.pdf, 2009.

Juan Benet, David Dalrymple, Nicola Greco, Proof of Replication. Technical report, Protocol Labs, URL: https://filecoin.io/proof-of-replication.pdf, Jul. 23, 2017, Protocol Labs, San Fransisco.

Filecoin: A Decentralized Storage Network. Technical report, Protocol Labs, https://filecoin.io/filecoin.pdf July 19, 2017, Protocol Labs.

David Vorick and Luke Champine, Sia: Simple Decentralized Storage, Technical report, Nebulous, Inc., https://sia.tech/sia.pdf Nov. 29, 2014, Nebulous, Inc.

Shawn Wilkinson, Tome Boshevski, Josh Brandoff, James Prestwich, Gordon Hall, Patrick Gerbes, Philip Hutchins, and Chris Pollard, Storj: A Peer to Peer Cloud Storage Network, URL: https://www.storj.io/stoijv2.pdf, V2.0 Technical report, Storj Labs, Inc., Dec. 15, 2016, Storj Labs.

* cited by examiner

BLOCKCHAIN BASED PRIVACY COMPLIANCE PLATFORM

If an Application Data Sheet (ADS) has been filed on the filing date of this application, it is incorporated by reference herein. Any applications claimed on the ADS for priority under 35 U.S.C. §§ 119, 120, 121, or 365(c), and any and all parent, grandparent, great-grandparent, etc. applications of such applications, are also incorporated by reference, including any priority claims made in those applications and any material incorporated by reference, to the extent such subject matter is not inconsistent herewith.

BACKGROUND

The present invention relates to a computing environment, and more particularly related to security, data compliance, and managing privacy compliance of data in an organization using a blockchain.

SUMMARY

Disclosed herein is a blockchain based storage platform for managing privacy compliance in an organization. The storage platform comprises a plurality of storage servers and at least one storage controller, which may be a proxy server or on a user application. The at least one storage controller is configured to receive user data from a user associated with the organization. Upon receiving the user data, the storage controller splits the user data into a plurality of data chunks and store each data chunk of the plurality of data chunks on a separate storage server selected from the plurality of storage servers. Each of the plurality of data chunks are encrypted using encryption keys stored on a distributed ledger. Subsequent to splitting the user data, the storage controller may generate an authentication token corresponding to the stored user data, and a public key of a receiving party/organization. Finally, the storage controller provides the authentication token to the user to enable the user to securely share the stored user data with the organization.

Further, the present disclosure relates to a method of managing privacy compliance in an organization. The method comprises receiving, by a storage controller associated with a blockchain based storage platform, user data from a user associated with the organization. Further, the method comprises splitting the user data into a plurality of data chunks and store each data chunk of the plurality of data chunks on a separate storage server selected from a plurality of storage servers. Each of the plurality of data chunks are encrypted using encryption keys stored on a distributed ledger. Thereafter, the method comprises generating an authentication token corresponding to the stored user data and a public key of a receiving party/organization. Finally, the method comprises providing the authentication token to the user to enable the user for securely sharing the stored user data with the organization.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The accompanying drawings, which are incorporated in and constitute a part of this disclosure, illustrate exemplary embodiments and, together with the description, explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and regarding the accompanying figures. The present invention may be better understood, and its numerous objects, features, and advantages made apparent to those skilled in the art by referencing the figures. The present invention may be better understood, and its numerous objects, features, and advantages made apparent to those skilled in the art by referencing the accompanying drawings, wherein.

DETAILED DESCRIPTION

Figure 1:
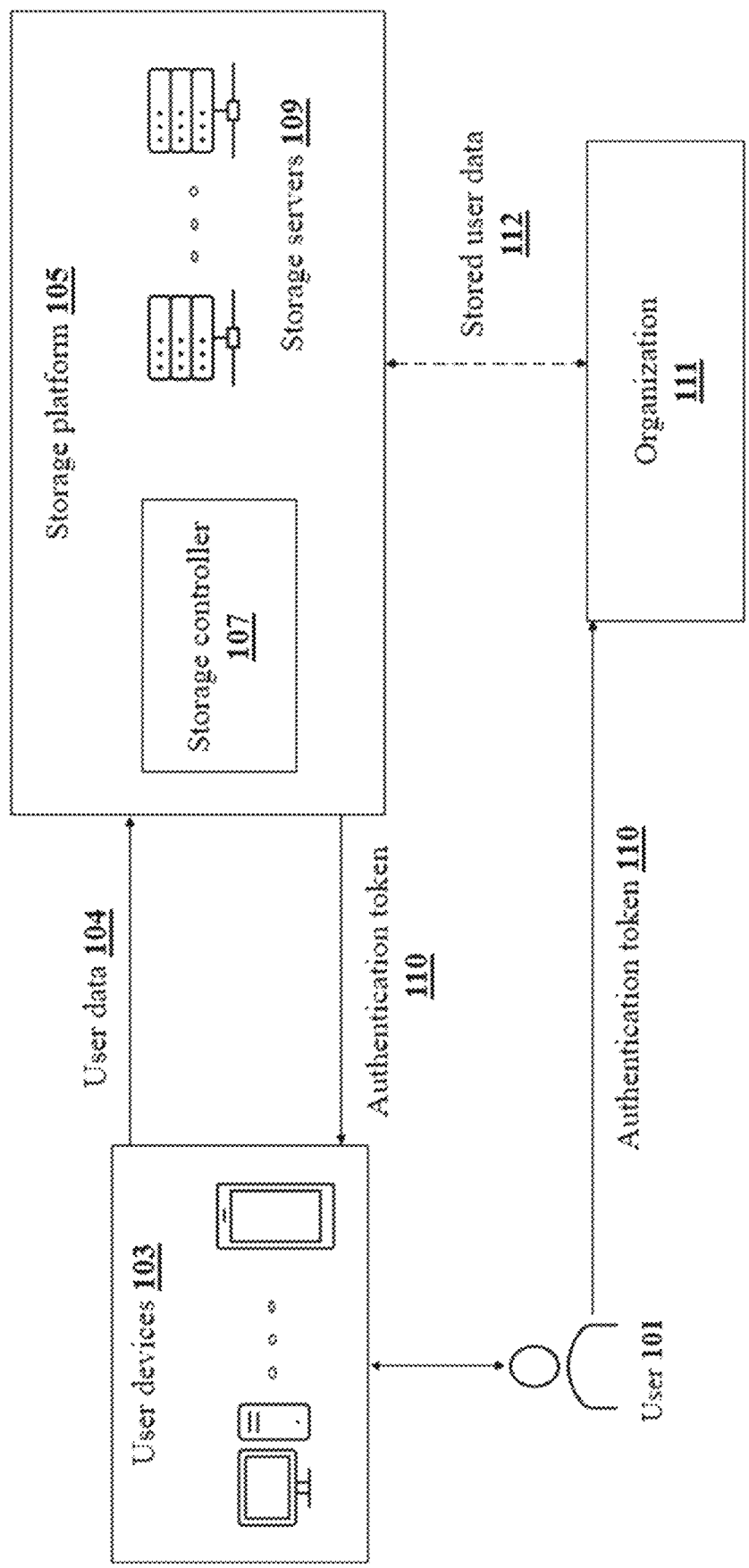
FIG. 1 illustrates an exemplary environment for managing data compliance in an organization in accordance with some embodiments of the present disclosure.

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the specific forms disclosed, but on the contrary, the disclosure is to cover all modifications, equivalents, and alternative falling within the scope of the disclosure.

The terms "comprises", "comprising", "includes", or any other variations thereof, are intended to cover a non-exclusive inclusion, such that a setup, device, or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method. Data compliance refers to the practice of ensuring that sensitive data belonging to a user or an organization is organized and managed in a way as to enable the organizations to meet enterprise business rules along with legal and governmental regulations. Generally, companies that work with individuals' personal information are responsible for protecting that personal data, since data compliance also pertains to the privacy of people's personal information and how the organizations store and secure that sensitive data. It is the responsibility of each organization to establish a robust data security policy to avoid possible cybersecurity threats, such as data breaches, that can put the personal information of its people and customers into risk. Also, having a robust data security policy helps the organization to avoid investigations by government regulators and issues relating to data security.

Presently, there are a variety of laws and regulations that focus on data protection and security compliance in organizations. Some of these regulations include standards like General Data Protection Regulation (GDPR), Payment Card Industry Data Security Standard (PCI DSS), Health Insurance Portability and Accountability Act (HIPAA), Federal Information Security Management Act of 2002 and the like. Often, the organizations tend to align their security programs with frameworks developed based on some of the above regulations in order to improve data security and ensure regulatory compliance. For example, an organization that intends to do business in Europe has to align itself with the GDPR standards, since the GDPR has laid down strict guidelines for the way any organization that does business with the EU member states can collect and process the personal information of the people living in the EU. Without adherence to the compliance requirements, the organization may end up paying fines ranging from 10 million Euros to two percent of its annual revenue, whichever is greater.

Therefore, if an organization requires its customers and the government regulators to trust its operation and intends to avoid undue issues with the security and compliance, it becomes extremely important for the organization to have a robust and efficient data compliance mechanism.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

FIG. 1 illustrates an exemplary environment for managing data compliance in an organization 111 in accordance with some embodiments of the present disclosure.

In an embodiment, the exemplary environment of FIG. 1 may include a user 101, one or more user devices 103 associated with the user 101, a blockchain based storage platform 105 and an organization 111.

In one embodiment, the user 101 may be an employee of the organization 111. In another embodiment, the user 101 may be a customer of the organization 111, which is providing a certain service to the user 101. In another embodiment, the user 101 may be an application collecting information from clients of the organization 111. As an example, the organization 111 may include, without limiting to, an enterprise company, an educational institution, a banking institution, a government office, a medical facility, and the like. During the course of association between the user 101 and the organization 111, the user 101 may have shared certain data and information with the organization 111, which is referred to as the user data 104 in the rest of the disclosure. As an example, the user data 104 may include, without limiting to, personal information of the user 101, records, consensus forms, test results, lab reports, and documents submitted by the user 101 to the organization 111. In the case of data pertaining to the user 101, such as a lab report generated by an application, the data may be authorized by the user 101 for specific usages. According to various existing regulations and compliance requirements, the organization 111 must ensure that the user data 104, collected from the user 101, is safe and secure.

In an embodiment, the user devices 103 associated with the user 101 may include, without limiting to, a smartphone, a laptop, a desktop computer or a Personal Digital Assistance (PDA) of the user 101. The user 101 may use one of the user devices 103 to connect to the storage platform 105 and perform one or more actions including, without limitation, storing user data 104, accessing and modifying the user data 104 which is already stored on the storage platform 105 and receiving an authentication token 110 from the storage platform 105.

In an embodiment, the storage platform 105 may be a cloud-based storage unit, which may be provided as a Platform-as-a-Service (PaaS) application platform to the user 101 or the organization 111. In some implementations, the storage platform 105 may include a storage controller 107, a plurality of storage servers 109 and a distributed ledger network (shown and explained in FIG. 2). The storage controller 107 may be a processing component, such as a processor or a Central Processing Unit (CPU), which controls and monitors storage space, storage arrays, cache memory and connection interfaces between a controlling network and the plurality of storage servers 109 in the storage platform 105. Alternatively, the storage controller 107 may be a proxy server or on a user application. In other words, the storage controller 107 may be responsible for executing all the operations of the storage platform 105. In an implementation, the plurality of storage servers 109 may be the actual storage space used for storing, accessing, and managing the user data 104 received from the user 101. In an embodiment, each storage server of the plurality of storage servers 109 may be deployed and managed independently, possibly from distinct geographical locations to make the storage platform 105 distributed and robust.

Currently, the organization 111 may be held liable for maintaining security and integrity of the user data 104. In an embodiment, one of the objectives of the disclosure is to shift and/or transfer this liability on to the users 104, thereby giving complete ownership and control over the user data 104 to the user 101. The shifting of liability ensures that the user 101 can self-verity, evaluate or even modify the user data 104, without involving the organization 111. Other objectives of the propose disclosure include enhancing security of the stored user data 112 and preventing security breaches on the stored user data 112. The above objectives may be achieved by allowing the user 101 to store the user data 104 on the storage platform 105 and then providing complete control over the stored user data to the user 101, as disclosed in the following sections of the disclosure.

In an embodiment, upon receiving the user data 104 from the user 101, the storage controller 107 may split the user data 104 into a plurality of data chunks of smaller size. For example, if the user data 104 is 5 MB, then the storage controller 107 may split the user data 104 into five smaller data chunks of 1 MB each. Further, the storage controller 107 may store each data chunk of the plurality of data chunks on a separate storage server selected from the plurality of storage servers 109. This ensures that the user data 104 is not stored on a single storage server, thereby protecting it from possible single-point failures and single-point attacks or breaches. Since the user data 104 is split and stored on multiple storage servers 109, it would be impossible for an attacker to access the whole user data 104 unless the attacker breaks through each of the plurality of storage servers 109. Though the attacker manages to access the chunks of user data 104 stored on each of the plurality of storage servers 109, it may not be possible to stitch together the chunks of data to obtain the original user data 104.

In addition, each of the plurality of data chunks may be encrypted using encryption keys stored on a distributed ledger to further enhance the security of the user data 104 being stored and maintained in the storage platform 105. In an embodiment, the encryption keys for encrypting the data chunks may be dynamically generated by the storage controller 107 in real-time. In an embodiment, the same user key or a proxy key may be used to encrypt each data chunk. However, the encryption key may be sent to multiple servers, each of which have their own server access key.

In an embodiment, upon storing the user data 104 on the plurality of storage servers 109, the storage controller 107 may generate a unique authentication token 110, which specifically represents and points to the stored user data 112. Essentially, the authentication token 110 may be a security token which uniquely identifies and authorizes a user 101 to access and manage the stored user data 112. As an example, without limitation, the authentication token 110 may be a hexadecimal code, a web link and the link. In an embodiment, upon generating the authentication token 110, the storage controller 107 may return and/or share the authentication token 110 with the user 101. Thereafter, the user 101 may access and/or edit the stored user data 112 using the authentication token 110.

In an embodiment, the user 101 may share the authentication key with the organization 111 for allowing the organization 111 to access and update the stored user data 112 using the authentication key. In addition, the user 101 may share the authentication key with one or more other users, such as audit personnel and service providers, to allow them access and update the stored user data 112. In an embodiment, the user 101 may also assign different access permissions to each user 101 based on the requirements.

In an embodiment, each action performed on the stored user data 112 may be continuously recorded on the distributed ledger network associated with the storage platform 105. As an example, the actions that are recorded on the distributed ledger may include, without limiting to, access date, access time, accessing user, deletion of data, addition of new data, modification of existing data and the like. In other words, the distributed ledger network keeps a track of each action related to the stored user data 112 and stores it immutably. Thus, the user 101, at any point in time, may check and verity the status of the stored user data 112 by simply referring to the distributed ledger network. This ensures transparency in the maintenance of the stored user data 112 since each action performed on the stored user data 112 is visible to the user 101. In an embodiment, information recorded on the distributed ledger may be also used for easy auditing of the stored user data 112.

Figure 2:
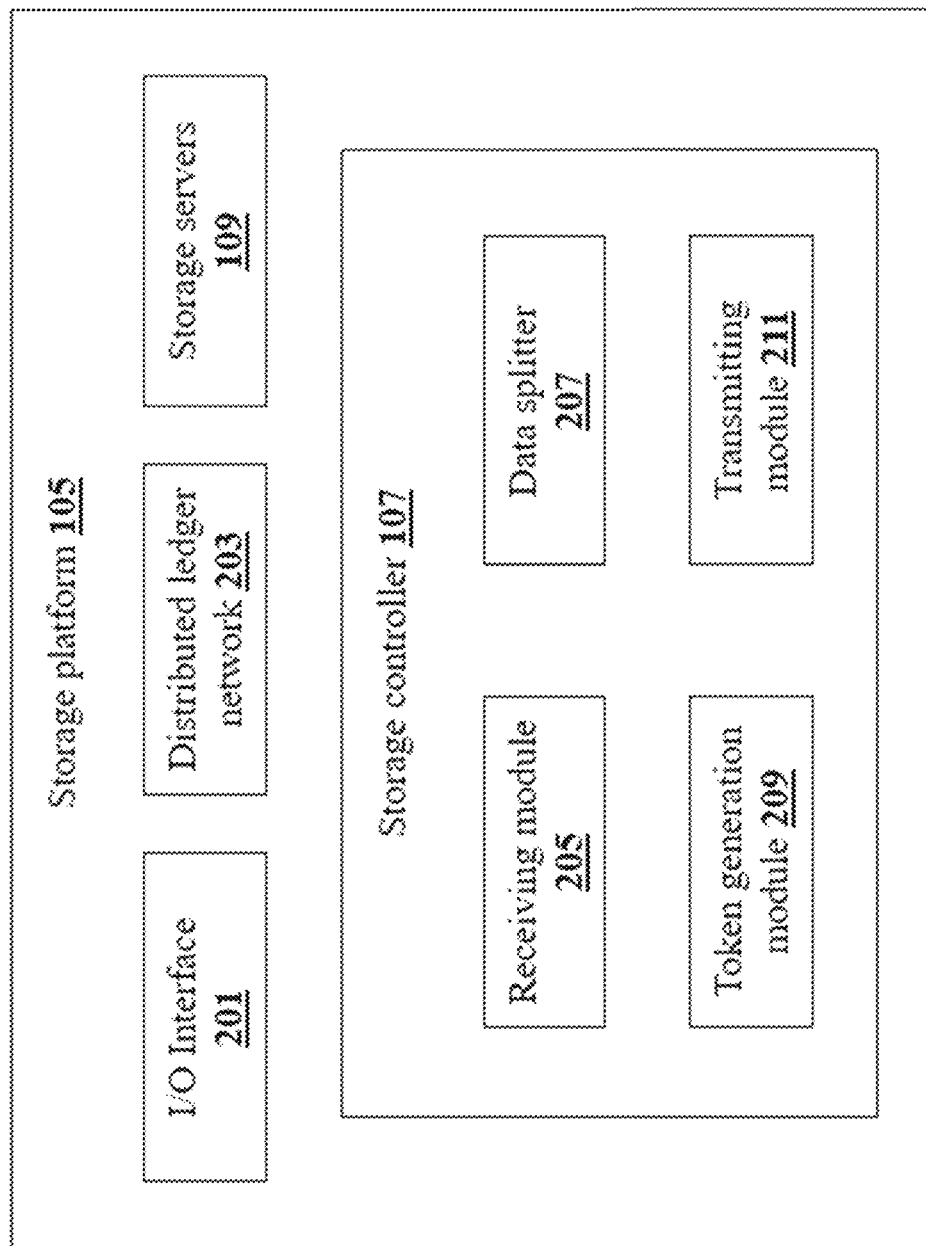
FIG. 2 shows a detailed block diagram illustrating a blockchain based storage platform in accordance with some embodiments of the present disclosure.

FIG. 2 shows a detailed block diagram illustrating a blockchain based storage platform 105 in accordance with some embodiments of the present disclosure.

In some implementations, the storage platform 105 may include an I/O interface 201, a distributed ledger network 203, a plurality of storage servers 109 and a storage controller 107. The I/O interface 201 may be used for communicatively interfacing with one or more user devices 103 and one or more computing devices associated with the organization 111 or other third-party users. In an embodiment, the I/O interface 201 facilitates the users in accessing or updating the user data 104 stored on the storage platform 105. The storage controller 107 may be configured to perform and monitor each operation of the storage platform 105 with the help of one or more modules configured in the storage controller 107.

In an embodiment, the distributed ledger network 203 associated with the storage platform 105 may be a shared and synchronized digital data record that stores and replicates the data. Though the distributed ledger network 203 is shown to be present within the storage platform 105 in FIG. 2, in the actual implementation of the storage platform 105, the distributed ledger network 203 may be an external digital network, which may be spread across multiple sites, institutions and countries. In an embodiment, the distributed ledger network 203 may be used to store, without limitation, the encryption keys used for encrypting the data chunks and information relating to one or more actions performed on the stored user data 112. In an embodiment, the information stored on the distributed ledger network 203 may be immutable and can only be viewed by the user 101.

In some implementations, the one or more modules configured within the storage controller 107 may include, without limiting to, a receiving module 205, a data splitter 207, a token generation module 209 and a transmitting module 211. As used herein, the term module may refer to an Application Specific Integrated Circuit (ASIC), an electronic circuit, a hardware processor (shared, dedicated, or group) and memory that execute one or more software or firmware programs, a combinational logic circuit, and/or other suitable components that provide the described functionality. In an implementation, each of the modules may be configured as stand-alone hardware computing units. In an embodiment, any other module may be used to perform various miscellaneous functionalities of the storage controller 107. It will be appreciated that such one or more modules may be represented as a single module or a combination of different modules.

In an embodiment, the receiving module 205 may be configured for receiving the user data 104 to be stored on the storage platform 105 from the user 101. In addition, the receiving module 205 may be used for receiving access requests from the organization 111, which seek to access the information stored on the storage platform 105.

In an embodiment, the data splitter 207 may be configured for splitting the user data 104 into multiple chunks of data. Further, the data splitter 207 may also be configured for forwarding each chunk of the user data 104 to a predefined storage server for storing the chunks of data.

In an embodiment, the token generation module 209 may be configured for generating an authentication token 110 corresponding to the user data 104 stored by the user 101. The authentication token 110 generated by the token generation module 209 may be used for accessing the stored user data 104 112. In an implementation, the token generation module 209 may generate a fresh authentication token 110 every time the user 101 has added new data or deleted or modified the existing user data 104 on the storage platform 105.

In an embodiment, the transmitting module 211 may be configured for forwarding and/or providing the authentication token 110 to the user 101. The authentication token 110 may be transmitted to the user 101 over a private or secure communication channel.

Figure 3A:
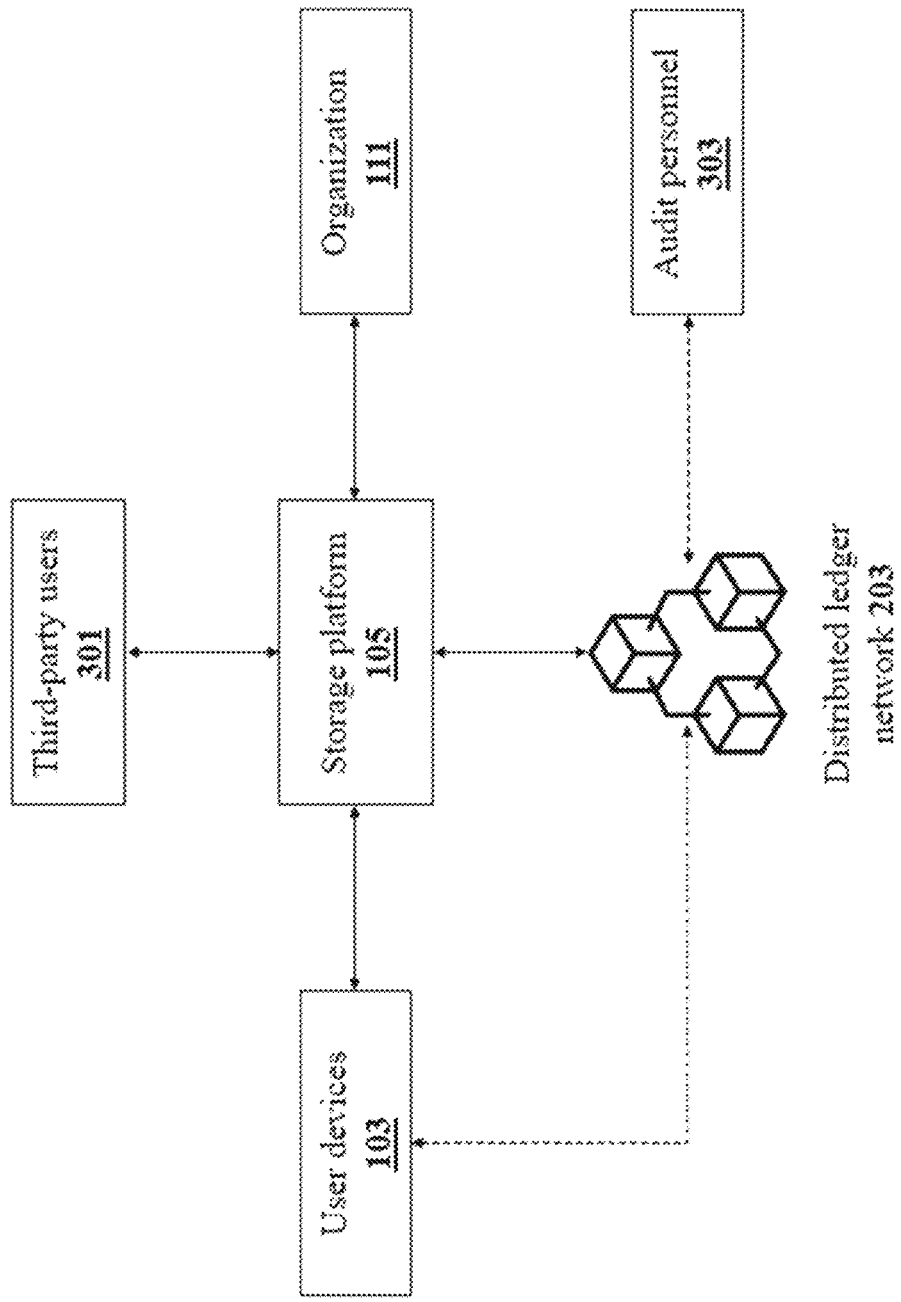
FIG. 3A illustrates role of distributed ledger network in the storage platform in accordance with some embodiments of the present disclosure.

FIG. 3A illustrates significance of the distributed ledger network 203 in the blockchain based storage platform 105 in accordance with some embodiments of the present disclosure. As shown in FIG. 3A, the distributed ledger network 203 may be directly associated with the storage platform 105 and may keep a track of all the data operations being performed on the user data 104 stored on the storage platform 105. As such, the stored user data 112 may be accessed and/or modified by at least one of the user 101 using the user devices 103, one or more third-party users 301 authorized by the user 101 and the organization 111. Consequently, the distributed ledger network 203 may track and record the data operations performed by each of the above entities and maintain it immutably. Thereafter, the updated records on the distributed ledger network 203 may be viewed and/or accessed by the user 101 or any audit personnel 303 associated with the organization 111.

In other words, the distributed ledger network 203 functions as a synchronized and distributed record, which keeps track of all the data operations. Accordingly, the distributed ledger ensures that the management of the stored user data 112 is made transparent to the user 101, since any changes made to the stored user data 112 are clearly visible to the user 101.

Figure 3B:
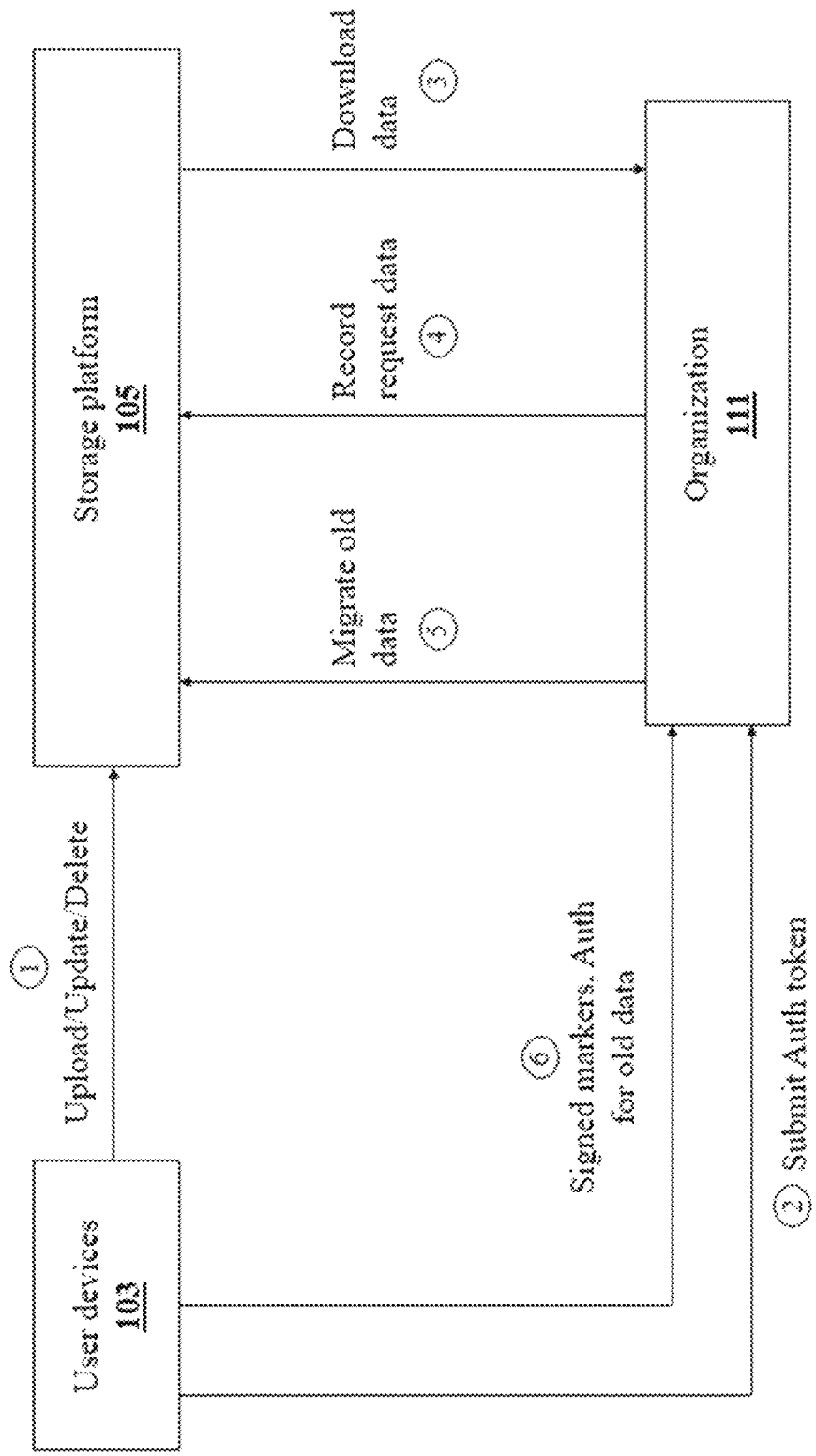
FIG. 3B illustrates steps involved in migrating old user data to the storage platform in accordance with some embodiments of the present disclosure.

FIG. 3B illustrates steps involved in migrating old user data 104 to the blockchain based storage platform 105 in accordance with some embodiments of the present disclosure. At step 1, the user 101 may upload the user data 104 to be stored in the storage platform 105 to the storage platform 105. If the user 101 has already stored certain user data 104 previously, then the user 101 may choose to update and/or delete the stored user data 112 already present in the storage platform 105. Upon receiving the user data 104 from the user 101, the storage platform 105 may securely store the user data 104 on the plurality of storage servers 109 and generate an authentication token 110 corresponding to the stored user data 112. Subsequently, at step 2, the user 101 may share and/or submit the authentication token 110 to the organization 111. At step 3, the organization 111 may download the stored user data 112 from the storage platform 105 using the authentication token 110 submitted by the user 101. Further, at step 4, the organization 111 may place requests for accessing the data from the storage platform 105. With due validation, the organization 111 may allow and/or prohibit the organization 111 from accessing the stored user data 112.

Figure 3C:
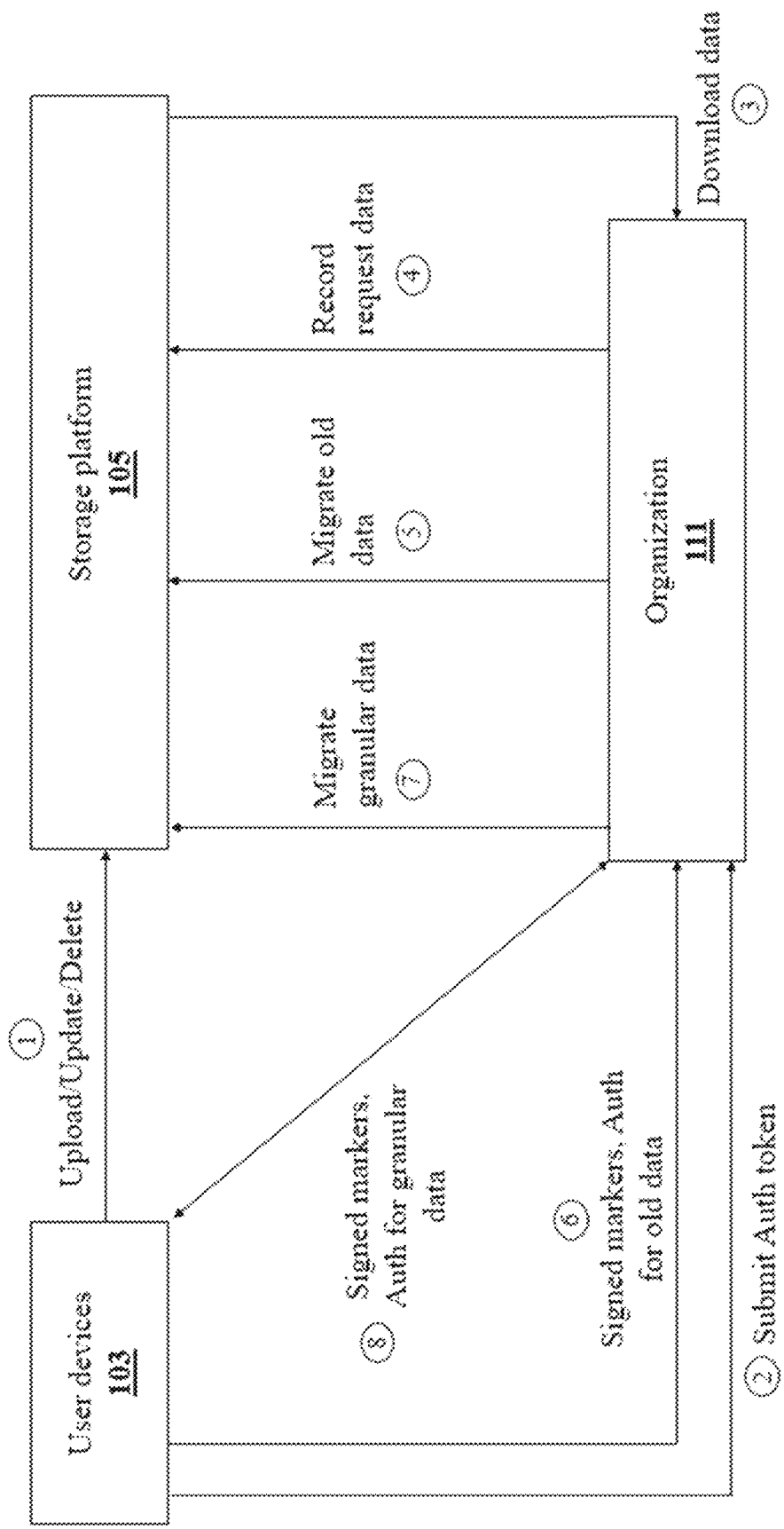
FIG. 3C illustrates steps involved in migrating pertinent granular data to the storage platform in accordance with some embodiments of the present disclosure.

In an embodiment, as shown in step 5, the present disclosure also allows the user 101 to migrate and/or shift the user data 104 existing on the organization 111 to the storage platform 105. The existing user data 104 may be migrated to the storage platform 105 in an incremental manner. The data migration may be completed when the authentication token 110 and signed markers corresponding to the migrated user data 104 are generated and submitted to the organization 111, as indicated in step 6. Thereafter, residual granular data associated with the migrated user data 104 may also be migrated to the storage platform 105 as shown in step 7 of FIG. 3C. Finally, the authentication token 110 and the signed markers corresponding to the granular data may be generated and provided to the organization 111, thereby allowing the organization 111 to access the migrated user data 104 and the associated granular data.

Figure 4A:
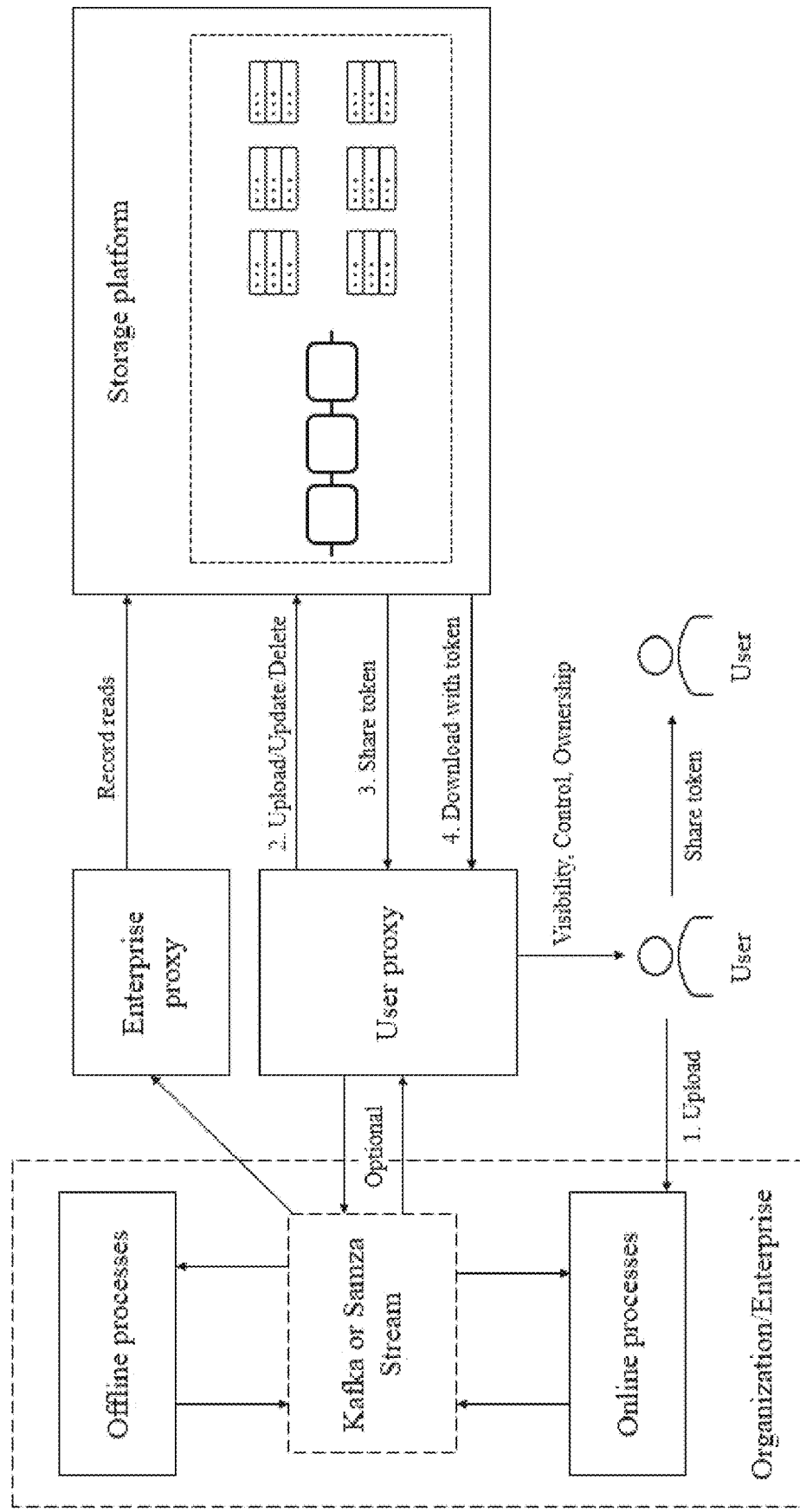
FIGS. 4A and 4B show an architecture illustrating integration of the storage platform with an organization in accordance with some embodiments of the present disclosure.
Figure 4B:
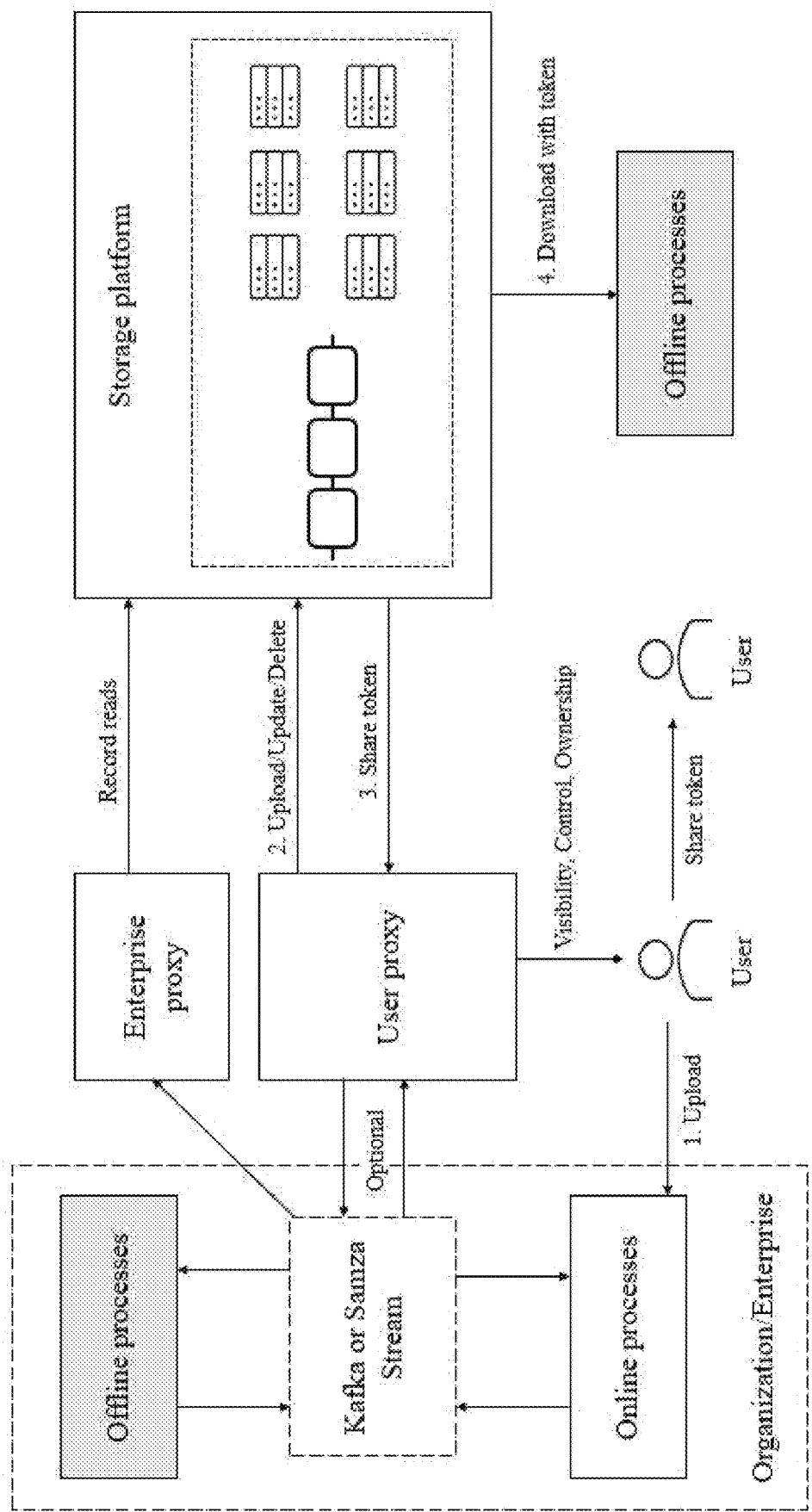

FIGS. 4A and 4B show an architecture illustrating integration of the blockchain based storage platform with an organization in accordance with some embodiments of the present disclosure.

In an embodiment, as shown in FIG. 4A, the storage platform 105 of the claimed invention (alternatively referred as 'OCHAIN' solution or 'Enterprise OCHAIN distributed storage platform') may be integrated with the existing in-line database system of an enterprise. The integration may be performed by configuring a stream-processing platform such as, for example, an Apache Kafka stream connector to consume changes made to user information entered in the database through existing enterprise user interface. In an embodiment, any other pub/sub pipeline process similar to Kafka stream connector may be used for the integration. Upon configuring the stream-processing connector, the 0Chain platform may be allowed to publish modified topic for offline services to consume through their offline database system such as Hadoop Distributed File System (HDFS). Subsequently, the latter may then publish the modified content on a usage topic to Kafka, which may be picked up by an Enterprise proxy and stamped on the blockchain.

In an embodiment, the information that the 0Chain publishes may be an authentication token 'authtoken' that provides consent to the enterprise to use their data. The 'authtoken' may be generated by the User Proxy. Thereafter, anytime the user changes data, a new 'authtoken' may be generated and published. The consumer of the user data on the HDFS (which serves as a secondary offline database and used for business analytics), such as an AI application, can then take the data and publish the usage of the user data on the Kafka stream. Subsequently, the published data may be picked up by the Enterprise proxy and stamped on the blockchain, showing to the user the consumer of their data.

In an embodiment, the User proxy may act as an interface between the enterprise Kafka connector to consume the data activity changes as the user enters new data, deletes existing data or updates the data through their existing enterprise user interface. The User proxy may initially create a wallet, perform allocation, and do data operations on behalf of the user as it consumes data from the Kafka stream. The User proxy may also provide the user a visibility of the data activity on the 0chain platform, and allow the user to share their data to any third-party organization. In an embodiment, the action of deletion of the existing data and making changes to the existing data may also be supported through the User proxy, similar to the functions already existing in the conventional enterprise user interfaces.

In an embodiment, a mobile-based, desktop-based or a web-based UI may be provided for user rights access, sharing and visibility of their data. This aspect itself is an inventive feature that enables the enterprises to not only use the 0chain platform to reduce risk, liability and legal cost, but also generate revenue and create a trust brand for the enterprise. FIG. 4B shows downloading the modified content from the storage platform using offline processes as explained above.

Converting an Existing Enterprise into a GDPR-Compliant Enterprise:

Most of the existing enterprises and organizations may not be compliant with the norms of General Data Protection Regulation (GDPR). Making these enterprises compliant with the GDPR policies becomes extremely important since failure to comply will likely result in the organization/ enterprise acquiring a poor reputation. This, in turn, may lead to a decline in the consumer trust on the organization.

In an embodiment, a method for converting the existing/ conventional enterprises into a GDPR-compliant enterprise using the mechanism depicted in FIG. 4B is disclosed. In an embodiment, the 0Chain platform may be seamlessly integrated and provided to the enterprise using the streaming APIs that the enterprise already has. As an example, a LinkedIn® user may continue to use the LinkedIn® user interface to enter data and the entered data may be taken to an online database, and subsequently streamed to an offline database system. The 0Chain platform, which acts as an offline system, may receive the data and then share it to other offline systems and even back to the online system. Thereafter, each of enterprise system, irrespective of whether it is an online or offline system, may keep this data in a "cache" for a limited period of time and request access from the 0Chain distributed storage system. Here, the 0Chain storage system may act as a single source of data repository.

In an embodiment, all the other systems may download the data stored on the 0Chain storage for a limited period of time, before the data is expected to be erased. Also, this data activity may be recorded on the 0Chain ledger. Thus, a non-invasive way to transform existing enterprise systems into a GDPR-compliant enterprise by using the stream mechanism (i.e., kafka) and related user and/or enterprise proxy servers is disclosed. Additionally, the disclosed embodiment uses shared links between the online and offline partner systems to record data activities of the users, thereby avoiding joint controller issues by showing clear demarcation of data ingress, usage and erasure of data. Moreover, with the aforesaid feature, the claimed invention may avoid jurisdictional issue of Schrems II by configuring a controller to own the data before uploading it to a cloud platform.

Figure 4C:
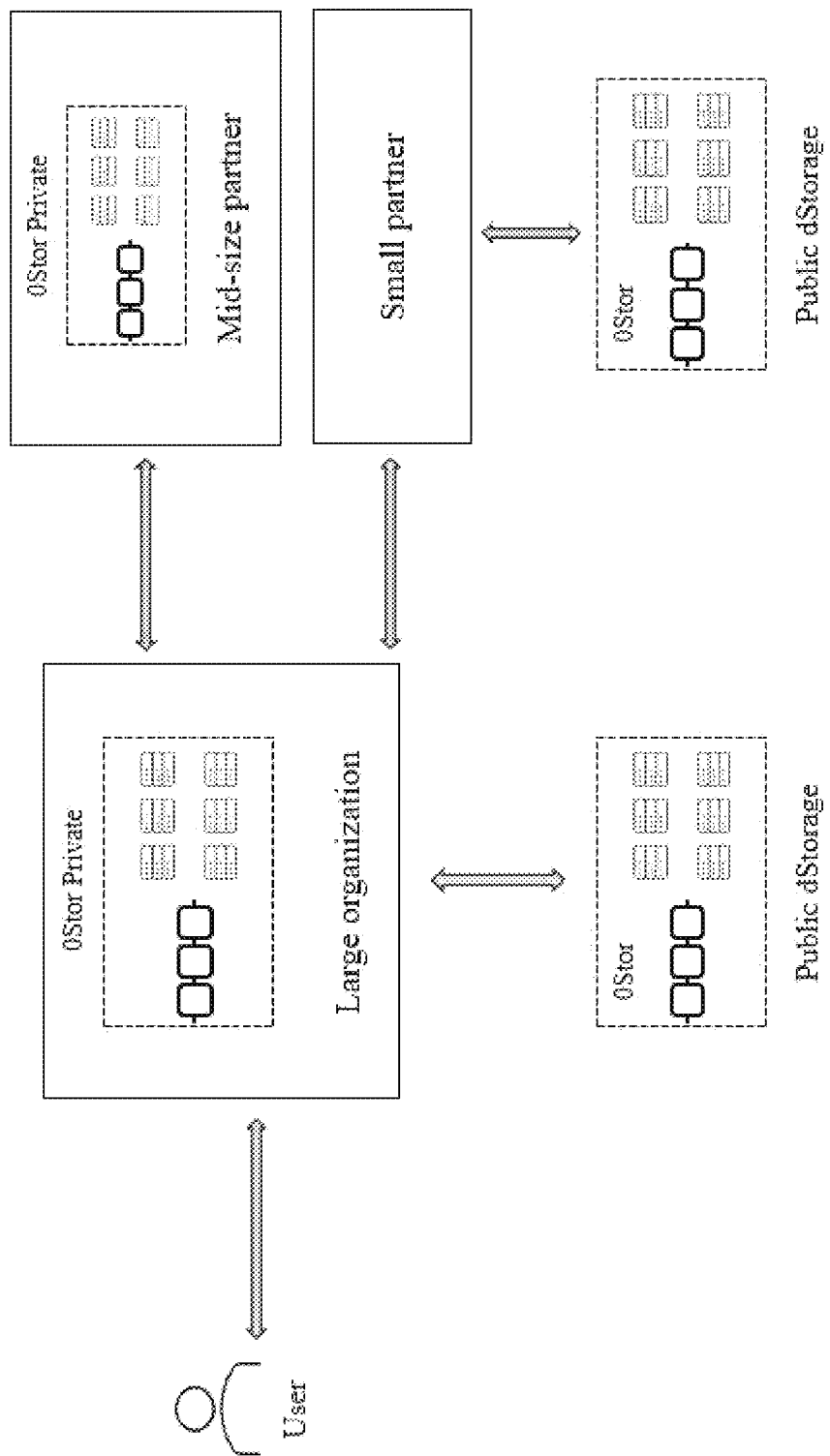
FIG. 4C shows an architecture illustrating a walled privacy configuration of the storage platform in accordance with some embodiments of the present disclosure.

FIG. 4C shows an architecture illustrating a walled privacy configuration of the storage platform in accordance with some embodiments of the present disclosure.

In an embodiment, the storage platform and/or 0Chain platform of the claimed invention may be used by enterprises that value privacy compliance. It may be recommended for the larger organizations to have a dual setup of a private 0Stor and use the public 0Chain network to store and record data activities. The small organizations and/or partners may spin up their own private 0Chain platform to keep track of data operations including, without limiting to, data ingress, egress, and erasure, use the public network for a lower cost approach, or have both systems as depicted in FIG. 4C. In an embodiment, all the parties may benefit from having a simple compliance solution that allows each enterprise to create a walled garden of user data with a single data repository and protect against liability.

Figure 5A:
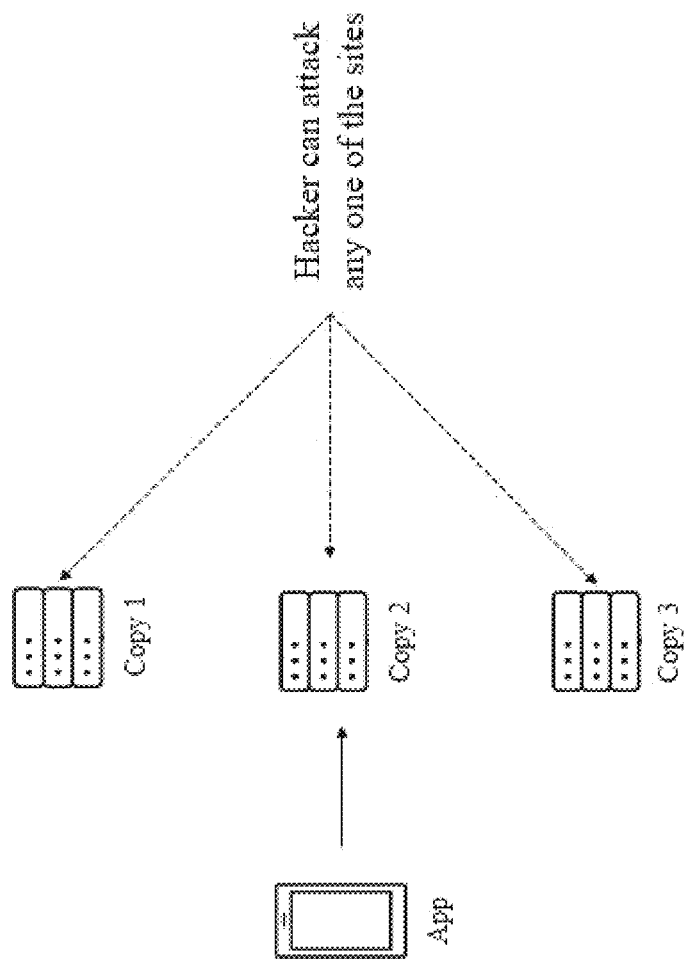
FIGS. 5A and 5B show a comparison between conventional data security approach and distributed storage platform of the claimed invention in accordance with some embodiments of the present disclosure.
Figure 5B:
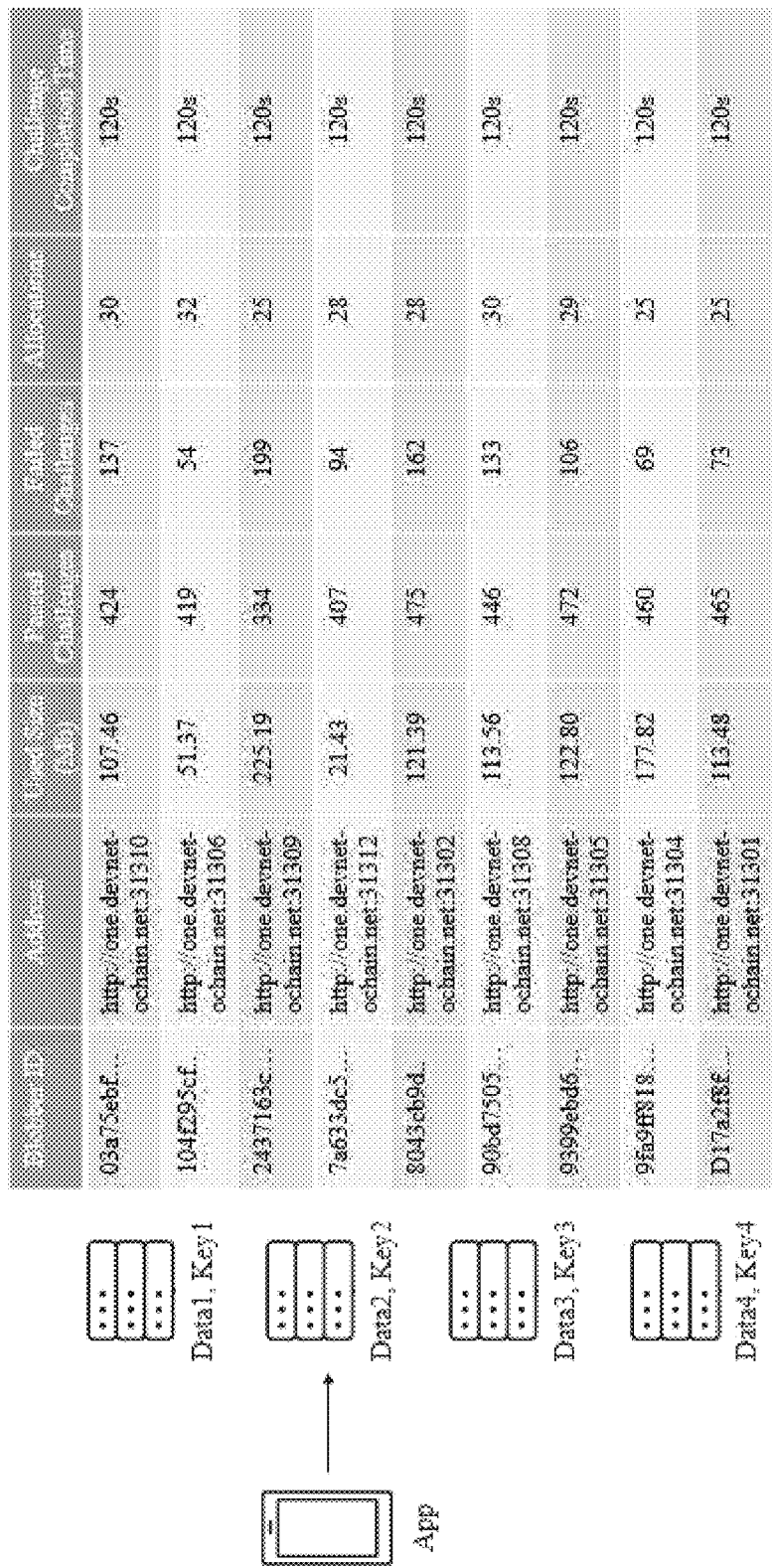

FIGS. 5A and 5B show a comparison between conventional data security approach and distributed storage platform in accordance with some embodiments of the present disclosure.

As shown FIG. 5A, in a traditional replication scheme, multiple redundant copies of the user data or information may be stored on multiple server locations. However, here a hacker may get hold of the user data by breaching or attacking at least one server in the set-up. As a result, in spite of having multiple copies of the data, the traditional replication schemes are vulnerable to attacks.

On the other hand, as shown in FIG. 5B, in the disclosed 0chain solution, the data at rest and transit may be secured by splitting the data into pieces as they are sent and stored in multiple servers with separate authentication keys. In an embodiment, a 0Chain Privacy and Data Protection Platform (0Stor Private) may be used to reduce risk of attacks by providing a clear demarcation between controllers with records of data activities, breach protection, and allowing user ownership of data. As illustrated in the above paragraphs, the 0Chain platform may be superimposed on the typical enterprise system, and may be viewed as another offline system. Further, as shown in FIG. 5B, the user may upload data through an existing front-end into the enterprise system, as shown in step 1. Further, when the uploaded data enters the Kafka stream, the User proxy may consume it and upload to 0Stor, as shown in step 2, and publish tokens for different offline services that will consume user data, as shown in step 3. Subsequently, the offline services may directly download the data from 0Stor using the token, as shown in step 4. As a result, all the reads may be stamped on the 0Chain ledger.

In an embodiment, the offline services may also publish reads, deletions of cached data, and derivative data of the user. The Enterprise proxy may be the destination for such data and used to stamp these activities on the ledger and upload any derivative data. The data activities may be visible on the ledger for all parties to validate including users. The above process accomplishes two things:

Liability for the controller may be significantly reduced as all the activities are transparent and immutably recorded on the ledger.

User may get full visibility of all the activities using their data.

In an embodiment, the User proxy implementation may be a single allocation and volume for users with a unique folder for each user, which may have nested folders within. As the user uploads their data, such as messages, posts, images, and videos, they may be uploaded and recorded by the proxy on 0Stor. Further, the proxy may publish the token related to the file uploaded. The offline service may consume the token, and when the data is used, they may call 0Stor directly and retrieve the data. As the data is retrieved, it may be recorded on the blockchain and visibility and transparency may be provided to all parties regarding data activity. Also, the offline services may record deletion, sharing, and generation of derivative data through the Enterprise proxy, which will record all the enterprise activities related to the token. In an embodiment, these offline service events may be recorded on 0Stor along with any data that is uploaded by the service such as AI or derivative data that indirectly belongs to the user.

In the case of Schrems II decisions, the User proxy may be located in a jurisdiction that does not allow governments to look at the data and can be easily set up as a third-party entity. Since it is a part of the system, it may have inherent liability protection based on the immutable ledger activities that it initiates on behalf of the user.

In an embodiment, the 0Stor Private may provide the following features:
1. A transparent immutable ledger for:
   a. Tracking data movement between controllers
   b. Providing a clear delineation of responsibility and liability in case of a breach
2. A breach protection platform for storing data.
3. A single source of truth, rather than multiple copies in disparate systems which may be corrupted.

In an embodiment, the burden of liability for a joint controller set-up nay be determined from an immutable record of data activities. If all the controllers have their own 0Stor platform that immutably records data acquired from other controllers, then they may be protected against any joint liability and may provide bullet-proof arguments to show that the security of data and privacy are not compromised during a breach event.

In an embodiment, there may be a specific liability situations to consider where the data may be acquired by the 1st controller:
1. If the data is not accessed by the 2nd controller, then any breach may fall under the liability of the 1st controller.
2. If the data is deleted from the 2nd controller, then only the 1st controller may be responsible, unless it can be proven otherwise.
3. If the data is in possession of both parties at the time of the breach, then both controllers are equally responsible, unless one party can prove that the other was solely responsible. Since the ledger provides immutable entry of shared data, it may determine the timestamp of data requested by the 2nd controller. Then, whether the 2nd controller disclosed the data within the expired time limit may be investigated and present a lower cost and smaller risk to the business.

In an embodiment, if each controller has their own 0Stor platform and immutable records data acquired from the other controller and records deletion of data after the service, then they may be protected against any joint liability. This may provide a bullet-proof argument to show the security of data and privacy had not been compromised during a breach event. Further, each controller may have total control over the security and privacy of user data inherited from the other controller.

Deployment of 0Stor Private and Use of Public Stor:

In an embodiment, there may be two ways a private platform can be deployed. In the first case, it may be offered as a multi-controller system with shared ownership. In the second case, it may be provided as a platform owned and operated by the largest controller for the benefit of other controller partners. That is, in a multi-controller platform, new entities may join the cluster and provide consensus for ledger operations and contribute to storage as a shared secure data platform. The join may be done in a simple manner by registering the entity name to the creator of the private network. In this way, each entity may share the cost of the system and enhance the security of the network in a true decentralized manner. Further, these platforms may be ideal for organizations that are of the same size and doing business with each other.

In a private deployment, the creator may be expected to be the largest controller among the group. The creator may provide the infrastructure and network, and may have all the controls, while the joining partner is essentially a client on the network.

In an embodiment, for small organizations, it may be beneficial to leverage the public 0Stor to secure user data and protect it from joint controller privacy liabilities. The cost of operations and management may be lower, with better security and privacy than 0Stor Private.

Technical Benefits of the 0Chain/0Stor Private Platform:
1. Reduces joint controller-based risks:
   In an embodiment, each controller may spin up a 0Stor Private platform and record data activity events and provide internal breach security. Also, the platform may establish and prove clear demarcation of data ingress and deletion during a breach event.
2. Abide by Schrems II ruling with minimal changes:
   The controller allows user an option to own and control data, a mechanism that is automated using the 0Stor Private platform.
3. Lower legal cost:
   The 0Chain ledger may automatically provide a transparent data audit capability for anyone, including users and lawyers, and there may not be any discovery costs for either party.
4. Internal breach protection:
   In an embodiment, the encrypted data may be split up into shards in different servers with separate keys. For a hacker inside the company, they may need to get access to all the keys in order to breach the content, which is a near impossibility.

Figure 6A:
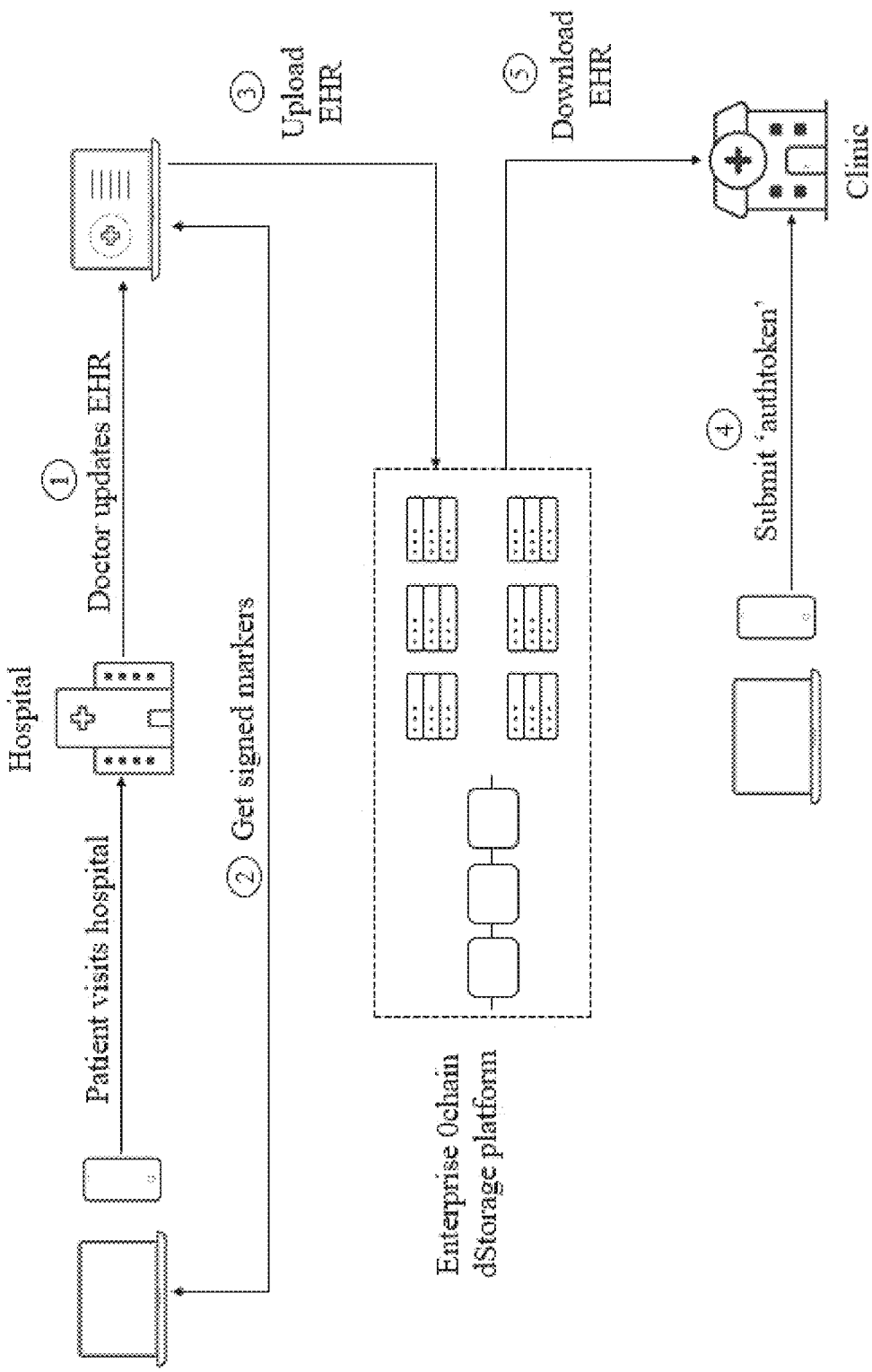
FIGS. 6A-6C illustrate exemplary embodiments in accordance with some embodiments of the present disclosure.

Exemplary Use Cases:

FIG. 6A illustrates application of the 0Chain platform in a medical organization such as hospitals and clinics. As an example, when a patient visits a hospital and consults a doctor, the doctor may create a patient-specific Electronic Health Record (EHR), which would comprise patient-specific information such as personal data of the patient, diagnosis information and reports. According to embodiments of the claimed invention, the EHR of the patient may be stored on the Enterprise 0Chain Distributed Storage platform, such that the EHR remains secure and becomes available for access by any doctor from any hospital or clinic. In an embodiment, once the doctor updates the EHR, a copy of the updated EHR may be stored on the 0Chain platform and a signed marker corresponding to the EHR may be shared with the patient. Subsequently, when the patient visits some other hospital or a clinic, he may submit the authentication token corresponding to the EHR stored on the 0Chain platform at the hospital or the clinic to allow a selected medical professional to access the EHR of the patient. In an embodiment, the patient may set permissions for the selected medical professional, based on which the medical professional may be allowed to either read, update or delete the EHR of the patient. Thus, the 0Chain platform ensures that the EHR and similar medical records of the patient remains secure, confidential and accessible for future uses.

Figure 6B:
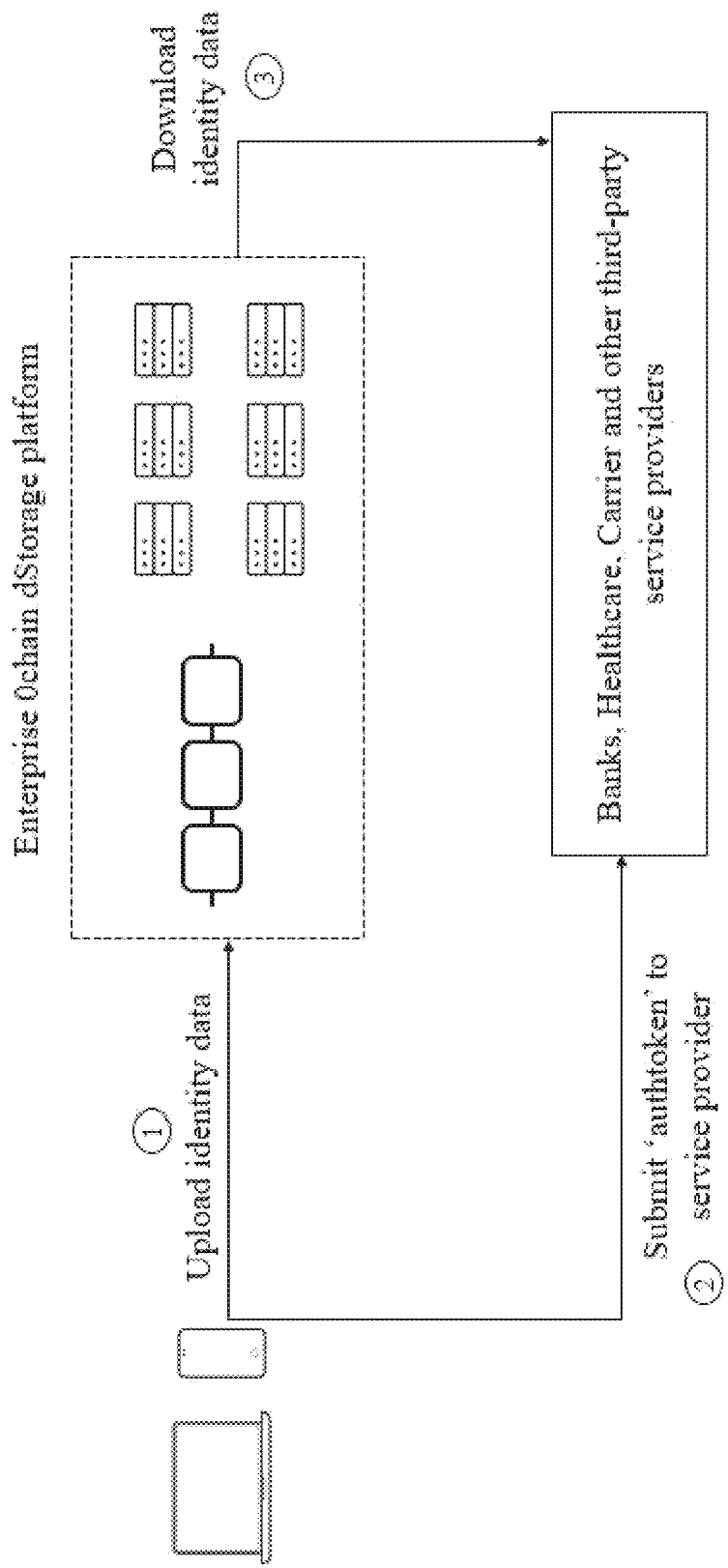

FIG. 6B illustrates application of the 0Chain platform for general utility use cases such as banks, carrier institutions and similar third-party service providers. In these use cases, the 0Chain platform may be used for storing and accessing customer identity data. Once the customer uploads his identity information on the 0Chain platform, the customer may submit the authentication token 'authtoken' to the required service provider. Subsequently, the service provider may download the required customer identity information from the 0Chain platform using the 'authtoken' received from the user. Thus, the 0Chain platform allows users to store their identity information on a secure storage and simplifies processes such as documentation and user identity verification for the service providers.

Figure 6C:
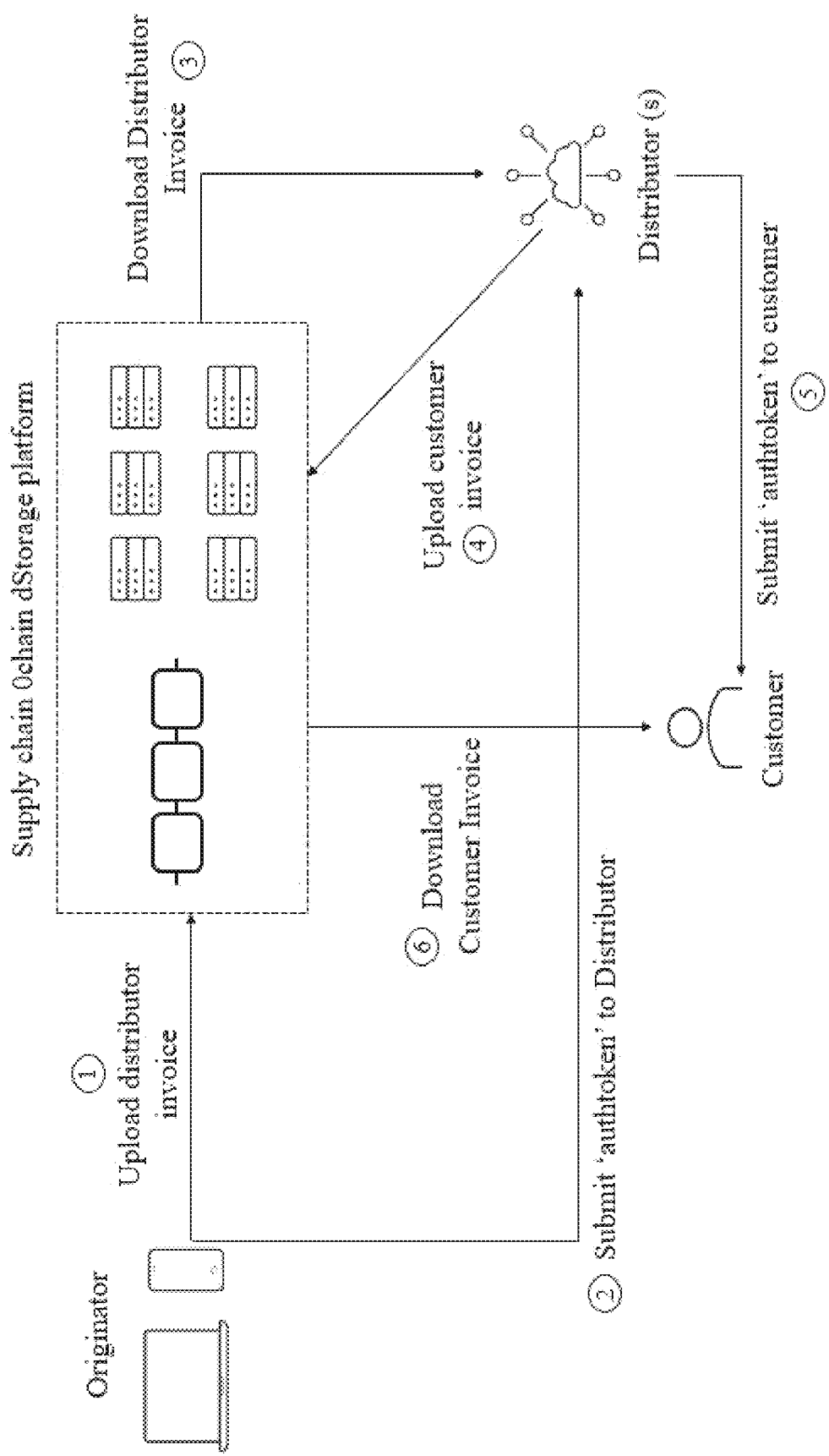

FIG. 6C illustrates another application of the 0Chain platform in a supply chain setup. Here, an originator may upload the distributor invoice on the 0Chain platform and share the 'authtoken' with the distributor. Subsequently, the distributor may download the distributor invoice and upload corresponding customer invoice back to the 0Chain platform. Parallelly, the distributor may share the 'authtoken' corresponding to the customer invoice with the customer, allowing the customer to retrieve the customer invoice from the 0Chain platform. Evidently, the 0Chain platform allows multiple entities and/or users to store, retrieve, update or delete data, documents and other information on a common distributed storage platform.

Figure 7A:
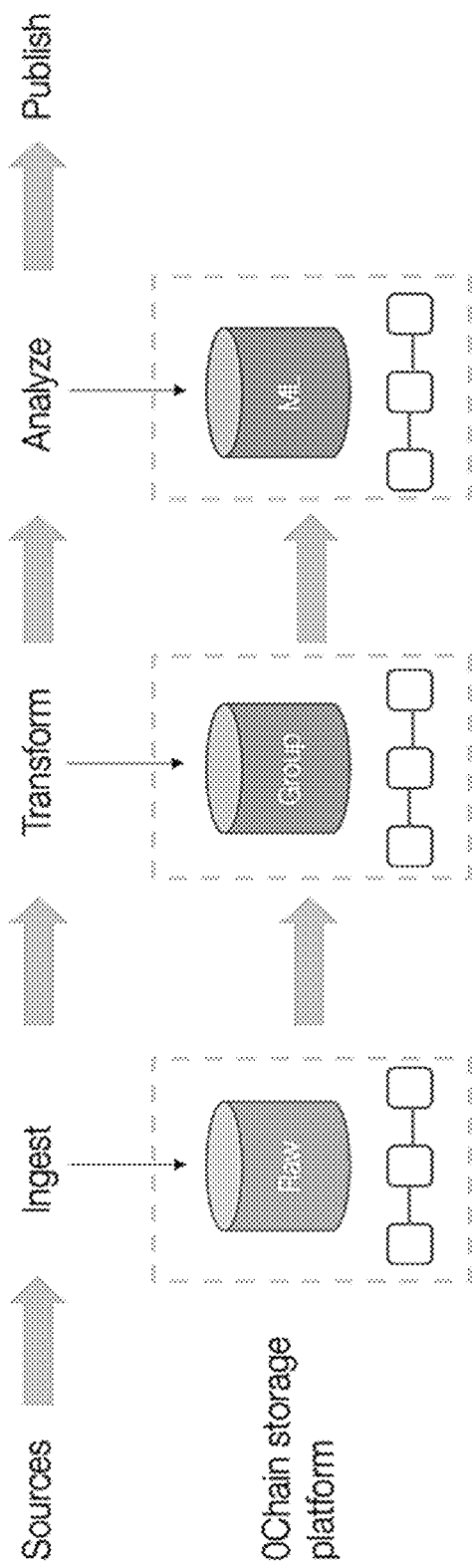
FIGS. 7A-7C illustrate a simple privacy compliant data like storage solution in accordance with some embodiments of the present disclosure.
Figure 7B:
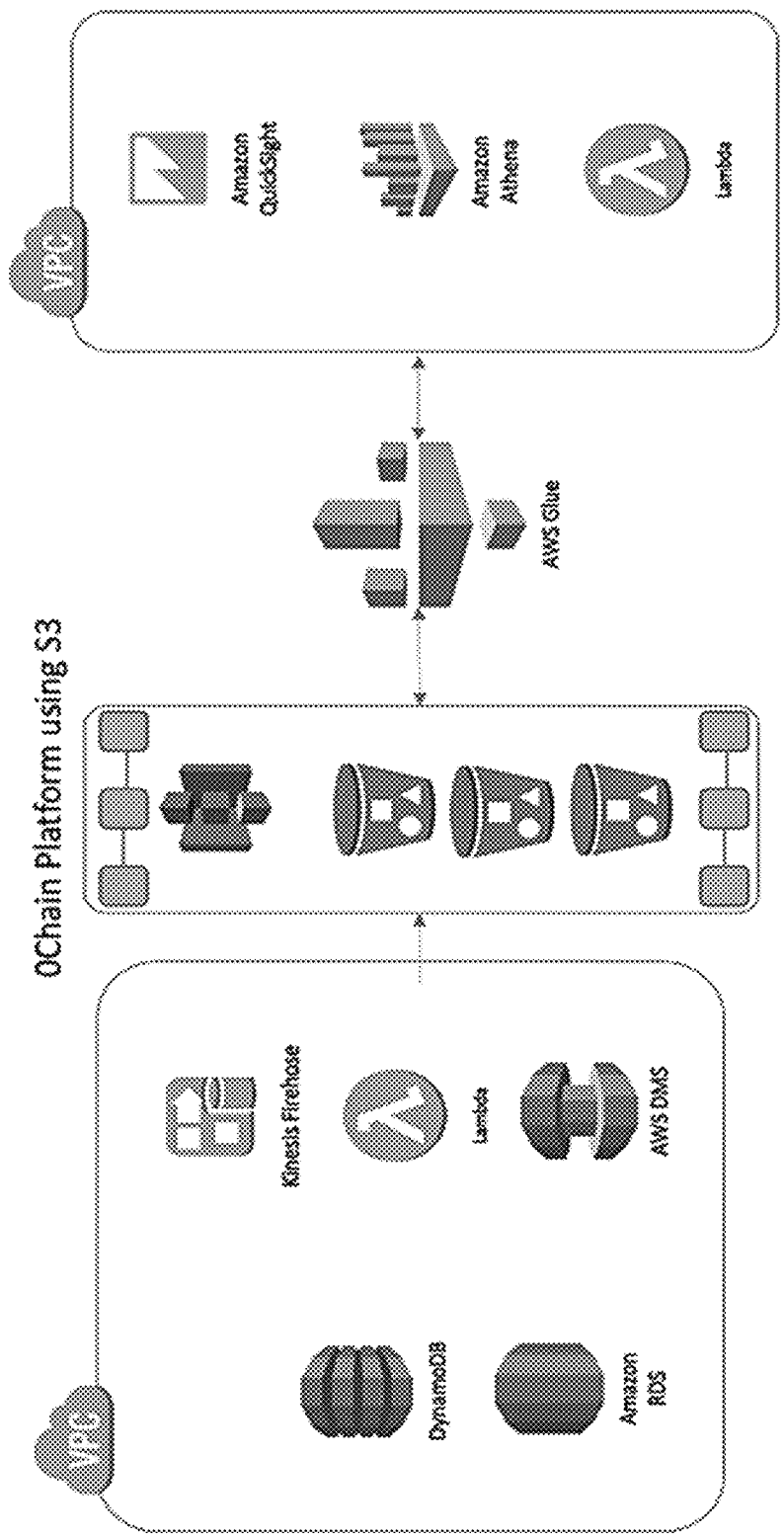
Figure 7C:
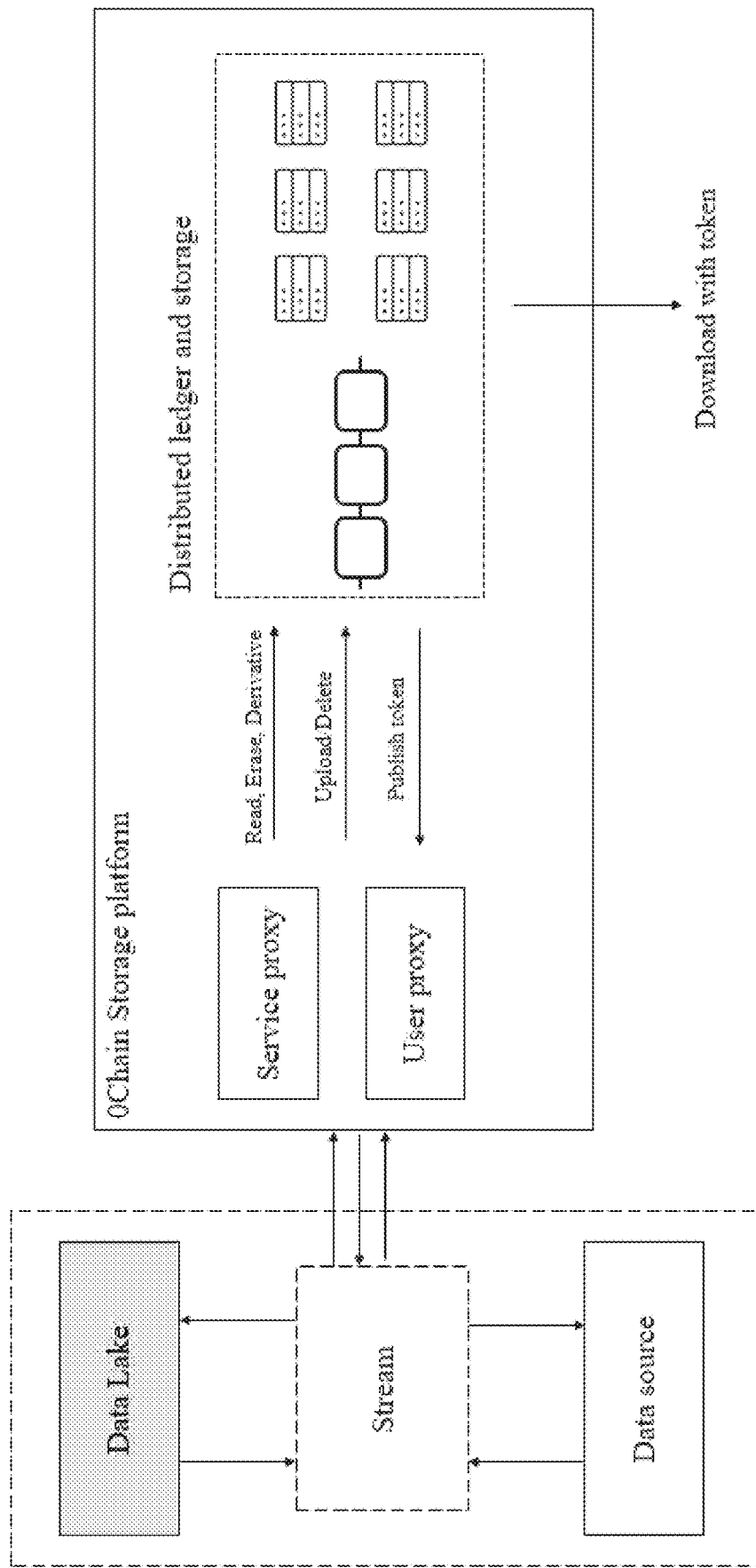

FIGS. 7A-7C illustrate a simple privacy compliant data lake storage solution in accordance with some embodiments of the present disclosure.

In an embodiment, the data privacy liability issues faced by the enterprises is exacerbated in the case of joint controllers and processors, where data breach in a large company or processor (such as AWS) affects its partners more so as they are held liable. In such situations, it may be very difficult to establish where the breach took place and which entity is liable.

In an embodiment, the disclosed 0Chain platform reduces such risks by providing a clear demarcation between controllers with records of data activities and breach protection.

FIG. 7A illustrates how enterprises can deploy the 0Chain platform on AWS as part of their data lake architecture to store their data. The 0Chain platform acts as a key audit-and-storage service component to make a generic data lake architecture to be a privacy and security compliant architecture. Instead of storing the data on S3 with plain audit logs, as it is currently being done, the enterprises can incorporate the 0Chain platform as a blockchain-based storage platform. In addition to using the S3 behind the scenes, the 0Chain platform also provides a simple blockchain based ledger that not only provides privacy compliance and removes existential threat of liability risks, but also enhances security and performance with this added layer of service.

FIG. 7B represents a typical AWS data lake architecture. Here, instead of just going to S3, the data can be moved to the 0Chain distributed storage platform, and audit logs may be recorded on the distributed ledger. As data traverses through different parts of the data lake such as, without limiting to, ingest, transform, and machine learning (ML) data, each of these services can store the data on the 0Chain platform as a walled data repository, and any query would be recorded on the blockchain.

Consequently, in addition to being a privacy compliant storage, the 0Chain platform may provide the additional features including, without limitation, a configurable data security and performance, a configurable breach protection and a single source of truth for data consistency and sharing.

FIG. 7C illustrates an architecture of how the 0Chain platform interacts with the enterprise system. As shown in the figure, one way to interact with the microservices in the data lake is to connect to a stream and consume the data and publish an authentication token for other services to retrieve the data directly from the 0Chain platform. The data stays inside the 0Chain, assured of its internal breach security and privacy, and can be directly accessed from other offline systems, third-party partners and the like.

Further, as depicted in FIG. 7C, the data source uploads data through a stream, and any user related data is then consumed by User Proxy and uploaded to 0Chain. Subsequently, an 'authtoken' is published for other services to consume this user data. The other services can then directly download the data from 0Chain using the 'authtoken'. Also, the other services can publish reads, deletions of cached data, and derivative data of the user. In an embodiment, the Service Proxy is the destination for such data and used to record these activities on the ledger and upload any derivative data. Data activities are visible on the ledger for all parties to validate including users and third-party partners and observers. The above process accomplishes at least the following aspects:

A. Liability for the controller is significantly reduced (to the extent of almost a zero liability) as all activities are transparent and immutably recorded on the ledger and would not be liable if a breach happens at their partner or the processor facility.

B. User and third-party partner has full visibility of their data activities.

Figure 8:
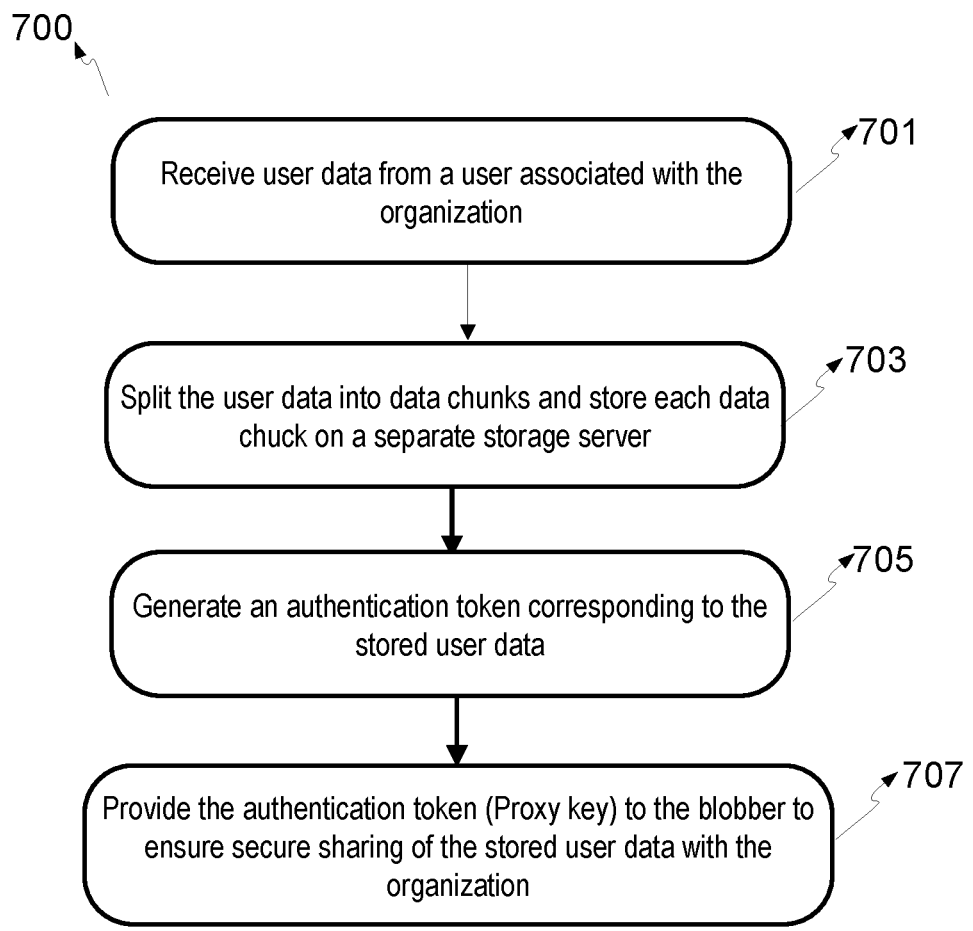
FIG. 8 shows a flowchart illustrating a method of managing data compliance in an organization in accordance with some embodiments of the present disclosure.

FIG. 8 shows a flowchart illustrating a method of managing privacy compliance in an organization 111 in accordance with some embodiments of the present disclosure.

As illustrated in FIG. 8, the method 700 may include one or more blocks illustrating a method of managing privacy compliance in an organization 111 using a storage controller 107 associated with a blockchain based storage platform 105 illustrated in FIG. 1. The method 700 may be described in the general context of computer executable instructions. Generally, computer executable instructions can include routines, programs, objects, components, data structures, procedures, modules, and functions, which perform specific functions or implement specific abstract data types.

The order in which the method 700 is described is not intended to be construed as a limitation, and any number of the described method blocks can be combined in any order to implement the method. Additionally, individual blocks may be deleted from the methods without departing from the scope of the subject matter described herein. Furthermore, the method can be implemented in any suitable hardware, software, firmware, or combination thereof.

At block 701, the method 700 includes receiving, by the storage controller 107 of the storage platform 105, user data 104 from a user 101 associated with the organization 111. In an embodiment, the user data 104 may include personal information related to the user 101 and information and documents related to the organization 111.

At block 703, the method 700 includes splitting, by the storage controller 107 of the storage platform 105, the user data 104 into a plurality of data chunks. Thereafter, each data chunk of the plurality of data chunks are stored on a separate storage server selected from a plurality of storage servers 109 associated with the storage platform 105. Further, to enhance security of the stored data, each of the plurality of data chunks may be encrypted using encryption keys stored on a distributed ledger. In an embodiment, the encryption keys used for encrypting the plurality of data chunks may be distributed and stored on a plurality of servers associated with the organization 111.

At block 705, the method 700 includes generating, by the storage controller 107 of the storage platform 105, an authentication token 110 corresponding to the stored user data 112. In an embodiment, a new authentication token 110 may be generated and provided to the user 101 whenever the stored user data 112 is modified by the user 101.

At block 707, the method 700 includes providing, by the storage controller 107 of the storage platform 105, the authentication token 110 to the user 101 to enable the user 101 for securely sharing the stored user data 112 with the organization 111. In an embodiment, the user 101 may share the authentication token 110 with the organization 111 for permitting the organization 111 to access and update the stored user data 112. Here, the user 101 may share the authentication token 110 with the organization 111 over a private communication link, thereby further enhancing the security of the storage platform 105.

In an embodiment, the information related to accessing of the user data 104 and any updates like deletion or modification in the user data 104 may be dynamically recorded on the distributed ledger. As an example, updates in the user data 104 may include at least one of addition of new user data 104, deletion of an existing user data 104, and modification of the existing user data 104 by the user or the organization 111. In other words, the distributed ledger may maintain immutable records comprising information related to accessing of the stored user data 112 and one or more updates made to the stored user data 112. Consequently, any data operation performed on the stored data is transparent to the user 101 and any other third-party to whom the user 101 has given access permission.

In an embodiment, the method 700 may be further used for migrating the old user data 104 and granular datasets, already stored in a local storage associated with the organization 111, to the storage platform 105. Additionally, an authentication token 110 corresponding to the old user data 104 and corresponding granular data sets may be generated and provided to the user 101.

In some embodiments, one or more steps of the method 700 of FIG. 8 may be repeated, where appropriate. Although this disclosure describes and illustrates particular steps of the method of FIG. 8 as occurring in a particular order, this disclosure contemplates any suitable steps of the method of FIG. 8 occurring in any suitable order. Moreover, although this disclosure describes and illustrates an example method for managing privacy compliance in an organization 111, including the particular steps of the method of FIG. 8, this disclosure contemplates any suitable method of managing privacy compliance including any suitable steps, which may include all, some, or none of the steps of the method of FIG. 8, where appropriate. Furthermore, although this disclosure describes and illustrates particular components, devices, or systems carrying out particular steps of the method of FIG. 8, this disclosure contemplates any suitable combination of any suitable components, devices, or systems carrying out any suitable steps of the method of FIG. 8.

Figure 9:
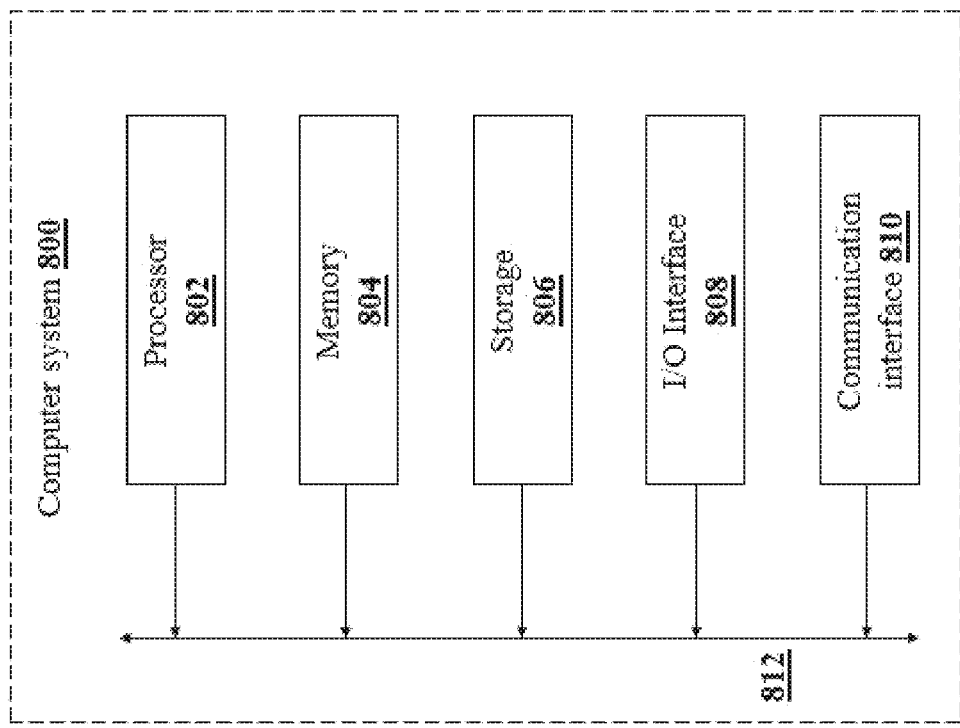
FIG. 9 illustrates a block diagram of an exemplary computer system for implementing embodiments consistent with the present disclosure.

Exemplary Computer System:

FIG. 9 illustrates an example computer system 800. In some embodiments, one or more computer systems 800 perform one or more steps of one or more methods described or illustrated herein. In some embodiments, one or more computer systems 800 provide functionality described or illustrated herein. In some embodiments, software running on one or more computer systems 800 performs one or more steps of one or more methods described or illustrated herein or provides functionality described or illustrated herein. Particular embodiments include one or more portions of one or more computer systems 800. Herein, reference to a computer system may encompass a computing device, and vice versa, where appropriate. Moreover, reference to a computer system may encompass one or more computer systems, where appropriate.

This disclosure contemplates any suitable number of computer systems 800. This disclosure contemplates computer system 800 taking any suitable physical form. As example and not by way of limitation, computer system 800 may be an embedded computer system, a System-On-Chip (SOC), a Single-Board Computer System (SBC) (such as, for example, a Computer-On-Module (COM) or System-On-Module (SOM)), a desktop computer system, a laptop or notebook computer system, an interactive kiosk, a mainframe, a mesh of computer systems, a mobile telephone, a Personal Digital Assistant (PDA), a server, a tablet computer system, or a combination of two or more of these. Where appropriate, computer system 800 may include one or more computer systems 800, be unitary or distributed, span multiple locations, span multiple machines, span multiple data centers, or reside in a cloud, which may include one or more cloud components in one or more networks. Where appropriate, one or more computer systems 800 may perform without substantial spatial or temporal limitation one or more steps of one or more methods described or illustrated herein. As an example, and not by way of limitation, one or more computer systems 800 may perform in real time or in batch mode one or more steps of one or more methods described or illustrated herein. One or more computer systems 800 may perform at different times or at different locations one or more steps of one or more methods described or illustrated herein, where appropriate.

In some embodiments, computer system 800 includes a processor 802, memory 804, storage 806, an Input/Output (I/O) interface 808, a communication interface 810, and a bus 812. Although this disclosure describes and illustrates a particular computer system having a particular number of particular components in a particular arrangement, this disclosure contemplates any suitable computer system having any suitable number of any suitable components in any suitable arrangement.

In some embodiments, processor 802 includes hardware for executing instructions, such as those making up a computer program. As an example and not by way of limitation, to execute instructions, processor 802 may retrieve (or fetch) the instructions from an internal register, an internal cache, memory 804, or storage 806; decode and execute them; and then write one or more results to an internal register, an internal cache, memory 804, or storage 806.

In some embodiments, processor 802 may include one or more internal caches for data, instructions, or addresses. This disclosure contemplates processor 802 including any suitable number of any suitable internal caches, where appropriate. As an example, and not by way of limitation, processor 802 may include one or more instruction caches, one or more data caches, and one or more Translation Lookaside Buffers (TLBs). Instructions in the instruction caches may be copies of instructions in memory 804 or storage 806, and the instruction caches may speed up retrieval of those instructions by processor 802. Data in the data caches may be copies of data in memory 804 or storage 806 for instructions executing at processor 802 to operate on; the results of previous instructions executed at processor 802 for access by subsequent instructions executing at processor 802 or for writing to memory 804 or storage 806; or other suitable data. The data caches may speed up read or write operations by processor 802. The TLBs may speed up virtual-address translation for processor 802.

In some embodiments, processor 802 may include one or more internal registers for data, instructions, or addresses. This disclosure contemplates processor 802 including any suitable number of any suitable internal registers, where appropriate. Where appropriate, processor 802 may include one or more Arithmetic Logic Units (ALUs), a multi-core processor or include one or more processors 802. Although this disclosure describes and illustrates a particular processor, this disclosure contemplates any suitable processor.

In some embodiments, memory 804 includes main memory for storing instructions for processor 802 to execute or data for processor 802 to operate on. As an example, and not by way of limitation, computer system 800 may load instructions from storage 806 or another source (such as, for example, another computer system 800) to memory 804. Processor 802 may then load the instructions from memory 804 to an internal register or internal cache. To execute the instructions, processor 802 may retrieve the instructions from the internal register or internal cache and decode them. During or after execution of the instructions, processor 802 may write one or more results (which may be intermediate or results) to the internal register or internal cache. Processor 802 may then write one or more of those results to memory 804. In particular embodiments, processor 802 executes only instructions in one or more internal registers or internal caches or in memory 804 (as opposed to storage 806 or elsewhere) and operates only on data in one or more internal registers or internal caches or in memory 804 (as opposed to storage 806 or elsewhere). One or more memory buses (which may each include an address bus and a data bus) may couple processor 802 to memory 804. Bus 812 may include one or more memory buses, as described below.

In some embodiments, one or More Memory Management Units (MMUs) reside between processor 802 and memory 804 and facilitate accesses to memory 804 requested by processor 802. In some embodiments, memory 804 includes Random Access Memory (RAM). This RAM may be volatile memory, where appropriate Where appropriate, this RAM may be Dynamic RAM (DRAM) or Static RAM (SRAM). Moreover, where appropriate, this RAM may be single-ported or multi-ported RAM. This disclosure contemplates any suitable RAM. Memory 804 may include one or more memories 804, where appropriate. Although this disclosure describes and illustrates particular memory, this disclosure contemplates any suitable memory.

In some embodiments, storage 806 includes mass storage for data or instructions. As an example and not by way of limitation, storage 806 may include a Hard Disk Drive (HDD), a floppy disk drive, flash memory, an optical disc, a magneto-optical disc, magnetic tape, or a Universal Serial Bus (USB) drive or a combination of two or more of these. Storage 806 may include removable or non-removable (or fixed) media, where appropriate. Storage 806 may be internal or external to computer system 800, where appropriate.

In some embodiments, storage 806 is non-volatile, solid-state memory. In some embodiments, storage 806 includes read-only memory (ROM). Where appropriate, this ROM may be mask-programmed ROM, Programmable ROM (PROM), Erasable PROM (EPROM), electrically erasable PROM (EEPROM), Electrically Alterable ROM (EAROM), or flash memory or a combination of two or more of these. This disclosure contemplates mass storage 806 taking any suitable physical form. Storage 806 may include one or more storage control units facilitating communication between processor 802 and storage 806, where appropriate. Where appropriate, storage 806 may include one or more storages 806. Although this disclosure describes and illustrates particular storage, this disclosure contemplates any suitable storage. In some embodiments, I/O interface 808 includes hardware, software, or both, providing one or more interfaces for communication between computer system 800 and one or more I/O devices. Computer system 800 may include one or more of these I/O devices, where appropriate. One or more of these I/O devices may enable communication between a person and computer system 800. As an example and not by way of limitation, a I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 808 for them. Where appropriate, I/O interface 808 may include one or more device or software drivers enabling processor 802 to drive one or more of these I/O devices. I/O interface 808 may include one or more I/O interfaces 808, where appropriate. Although this disclosure describes and illustrates a particular I/O interface, this disclosure contemplates any suitable I/O interface.

In some embodiments, communication interface 810 includes hardware, software, or both providing one or more interfaces for communication (such as, for example, packet-based communication) between computer system 800 and one or more other computer systems 800 or one or more networks. As an example and not by way of limitation, communication interface 810 may include a Network Interface Controller (NIC) or network adapter for communicating with an Ethernet or other wire-based network or a Wireless NIC (WN IC) or wireless adapter for communicating with a wireless network, such as a WI-FI network. This disclosure contemplates any suitable network and any suitable communication interface 810 for it. As an example and not by way of limitation, computer system 800 may communicate with an ad hoc network, a Personal Area Network (PAN), a Local Area Network (LAN), a Wide Area Network (WAN), a Metropolitan Area Network (MAN), or one or more portions of the Internet or a combination of two or more of these. One or more portions of one or more of these networks may be wired or wireless. As an example, computer system 800 may communicate with a Wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 800 may include any suitable communication interface 810 for any of these networks, where appropriate. Communication interface 810 may include one or more communication interfaces 810, where appropriate. Although this disclosure describes and illustrates a particular communication interface, this disclosure contemplates any suitable communication interface. In some embodiments, bus 812 includes hardware, software, or both coupling components of computer system 800 to each other. As an example and not by way of limitation, bus 812 may include an Accelerated Graphics Port (AGP) or other graphics bus, an Enhanced Industry Standard Architecture (EISA) bus, a Front-Side Bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 812 may include one or more buses 812, where appropriate. Although this disclosure describes and illustrates a particular bus, this disclosure contemplates any suitable bus or interconnect.

Herein, a computer-readable storage medium or media may include one or more semiconductor-based or other Integrated Circuits (ICs) (such, as for example, Field-Programmable Gate Arrays (FPGAs) or Application-Specific ICs (ASICs)), hard disk drives (HDDs), Hybrid Hard Drives (HHDs), optical discs, Optical Disc Drives (ODDs), magneto-optical discs, magneto-optical drives, floppy diskettes, Floppy Disk Drives (FDDs), magnetic tapes, Solid-State Drives (SSDs), RAM-drives, SECURE DIGITAL cards or drives, any other suitable computer-readable non-transitory storage media, or any suitable combination of two or more of these, where appropriate. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

ADVANTAGES OF THE EMBODIMENTS

In an embodiment, the present disclosure provides a blockchain based storage platform for securely storing and managing the user data in accordance with the data security and compliance requirements set by various regulations. In an embodiment, the storage platform of the present disclosure shifts liability of securing and protecting the user data to the actual owner/creator of the data, thereby relieving compliance burden from the organizations.

In an embodiment, the present disclosure ensures that the data operations performed on the user data stored on the storage platform are maintained in a distributed ledger network, thereby making it transparent to the user/owner of the user data.

In an embodiment, the storage platform of the preset disclosure splits the user data into multiple chunks and then stores encrypted version of each data chunk on separate storage servers, and thereby prevents possible security breaches/attacks on the stored user data.

The method and the storage platform disclosed in the present disclosure may be used to overcome various technical problems related to security and data compliance in an organization. The above said technical advancements and practical applications of the disclosed method and the storage platform may be attributed to the aspects of a) splitting the user data 104 into multiple data chunks and storing each chunk on different storage servers; b) generating a secure authentication key; and c) maintaining immutable records of the data operations on a distributed ledger network.

In light of the technical advancements provided by the disclosure, it shall be noted that the claimed steps, as discussed above, are not routine, conventional, or well-known aspects in the art, as the claimed steps provide the aforesaid solutions to the technical problems existing in the conventional technologies. Further, the claimed steps clearly bring an improvement in the functioning of the system itself, as the claimed steps provide a technical solution to a technical problem.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise. The enumerated listing of items does not imply that any or all the items are mutually exclusive, unless expressly specified otherwise. The terms "a", "an" and "the" mean "one or more", unless expressly specified otherwise.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

A description of an embodiment with several components in communication with each other does not imply that all such components are required. On the contrary, a variety of optional components are described to illustrate the wide variety of possible embodiments of the invention.

When a single device or article is described herein, it will be clear that more than one device/article (whether they cooperate) may be used in place of a single device/article. Similarly, where more than one device/article is described herein (whether they cooperate), it will be clear that a single device/article may be used in place of the more than one device/article or a different number of devices/articles may be used instead of the shown number of devices or programs. The functionality and/or features of a device may be alternatively embodied by one or more other devices which are not explicitly described as having such functionality/features. Thus, other embodiments of invention need not include the device itself.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true spirit being indicated by the following claims.

| Referral Numerals: | |
| --- | --- |
| Reference Number | Description |
| 101 | User |
| 103 | User devices |
| 104 | User data |
| 105 | Blockchain based storage platform |
| 107 | Storage controller |
| 109 | Storage servers |
| 110 | Authentication token |
| 111 | Organization |
| 112 | Stored user data |
| 201 | I/O Interface |
| 203 | Distributed ledger network |
| 205 | Receiving module |
| 207 | Data splitter |
| 209 | Token generation module |
| 211 | Transmitting module |
| 301 | Third-party users |
| 303 | Audit personnel |
| 800 | Exemplary computer system |
| 802 | Processor |
| 804 | Memory |
| 806 | Storage |
| 808 | I/O Interface of the computer system |
| 810 | Communication interface |

What is claimed is:

1. A decentralized blockchain based storage platform for managing privacy compliance in an organization, the storage platform comprising:
   a plurality of storage servers; and
   at least one storage controller, the at least one storage controller configured to:
   receive user data from a user associated with the organization;
   split the user data into a plurality of data chunks and store the each data chunk of the plurality of data chunks on a separate storage server selected from the plurality of storage servers, wherein the each of the plurality of data chunks are encrypted using encryption keys stored on a distributed ledger and wherein a first encryption key is used to encrypt a first data chunk by a first blobber and a second encryption key different from the first encryption key is used to encrypt a second data chunk by a second blobber;
   generate an authentication token corresponding to the stored user data and a public key of a receiving organization; and
   provide the authentication token to at least one of the user or a third-party entity with a public encryption key, to enable the user or the third-party entity to securely share the stored user data with the organization.

2. The storage platform according to claim 1, the user data comprises personal information related to the user and information and documents related to the organization and wherein the storage platform further comprises:
   selecting an initial set of storage controllers from a list of storage controllers for a fork, assigning an address to the fork to receive transactions, and wherein if the address is not assigned, a default address which is a genesis chain address is assigned; and
   utilizing the fork to process the user data received by the user.

3. The storage platform according to claim 1, wherein a new authentication token is generated and provided to the user whenever the user data is modified by the user.

4. The storage platform according to claim 1, wherein the authentication token is received by the organization to permit the organization to access and update the stored user data.

5. The storage platform according to claim 1, wherein information related to accessing of the user data and updates of the user data are dynamically recorded on the distributed ledger, wherein an operation of accessing the user data includes at least one of uploading, updating, downloading, deleting, renaming, copying, moving and sharing of data.

6. The storage platform according to claim 1, wherein the updates of the user data includes at least one of addition of new user data, deletion of an existing user data and modification of the existing user data by the user or the organization.

7. The storage platform according to claim 1, wherein the distributed ledger maintains immutable records comprising information related to accessing of the stored user data and one or more updates made to the stored user data.

8. The storage platform according to claim 7, wherein tracking accessing of the stored user data and one or more updates made to the stored user data is maintained in the distributed ledger.

9. The storage platform according to claim 1, wherein each of the at least one storage controller managing user data of one or more users are operationally demarcated for delineating user data belonging to each of the one or more users.

10. The storage platform according to claim 1, wherein the encryption keys used for encrypting the plurality of data chunks are distributed and stored on a plurality of servers associated with the organization.

11. The storage platform according to claim 1 is further configured to:
   migrate old user data and granular datasets, stored in a local storage associated with the organization, to the storage platform using a streaming platform of the organization; and
   generate authentication token corresponding to the old user data and the granular data sets.

12. The storage platform according to claim 1 is further configured to transform a non-compliant storage system into a security-compliant storage system using a predetermined streaming mechanism and at least one proxy server associated with the organization, wherein the streaming mechanism and the proxy server record data activities for a non-invasive migration of non-compliant storage system into a security-compliant storage system.

13. The storage platform according to claim 1 is configurable to be used in a data lake architecture to provide a privacy-compliant storage platform.

14. The storage platform according to claim 1 is configurable to replace a traditional storage platform including at least one of a Simple Storage Service (S3) or an object storage platform used in an organization.

15. A method of managing privacy compliance in an organization, the method comprising:
   receiving, by a storage controller associated with a blockchain based storage platform, user data from a user associated with the organization; splitting, by the storage controller, the user data into a plurality of data chunks and store the each data chunk of the plurality of data chunks on a separate storage server selected from a plurality of storage servers, wherein the each of the plurality of data chunks are encrypted using encryption keys stored on a distributed ledger and wherein a first encryption key is used to encrypt a first data chunk by a first blobber and a second encryption key different from the first encryption key is used to encrypt a second data chunk by a second blobber;
   generating, by the storage controller, an authentication token corresponding to the stored user data; and
   providing, by the storage controller, the authentication token to the user or a third-party entity with a public encryption key, to enable the user or the third-party entity for securely sharing the stored user data with the organization.

16. The method according to claim 15, wherein the user data comprises personal information related to the user and information and documents related to the organization and wherein the method further comprises:
   selecting an initial set of storage controllers from a list of storage controllers for a fork, assigning an address to the fork to receive transactions, and wherein if the address is not assigned, a default address which is a genesis chain address is assigned; and
   utilizing the fork to process the user data received by the user.

17. The method according to claim 15 further comprises generating and providing a new authentication token to the user whenever the stored user data is modified by the user.

18. The method according to claim 15, wherein the authentication token is received from the user by the organization over a private communication link, for permitting the organization to access and update the stored user data.

19. The method according to claim 15, wherein information related to accessing of the user data and updates in the user data are dynamically recorded on the distributed ledger, wherein an operation of accessing the user data includes at least one of uploading, updating, downloading, deleting, renaming, copying, moving and sharing of data.

20. The method according to claim 15, wherein the updates in the user data includes at least one of addition of new user data, deletion of an existing user data and modification of the existing user data by the user or the organization.

21. The method according to claim 15, wherein the distributed ledger maintains immutable records comprising information related to accessing of the stored user data and one or more updates made to the stored user data.

22. The method according to claim 21, wherein accessing of the stored user data and one or more updates made to the stored user data are tracked using the immutable records maintained in the distributed ledger.

23. The storage platform according to claim 15 further comprises operationally demarcating each of the at least one storage controller managing user data of one or more users for delineating user data belonging to each of the one or more users.

24. The method according to claim 15, wherein the encryption keys used for encrypting the plurality of data chunks are distributed and stored on a plurality of servers associated with the organization.

25. The method according to claim 15 further comprises:
   migrating old user data and granular datasets, stored in a local storage associated with the organization, to the storage platform using a streaming platform of the organization; and
   generating authentication token corresponding to the old user data and the granular data sets.

26. The method according to claim 15 wherein the storage platform is further configured to transform a non-compliant storage system into a security-compliant storage system using a predetermined streaming mechanism and at least one proxy server associated with the organization, wherein the streaming mechanism and the proxy server record data activities for a non-invasive migration of non-compliant storage system into a security-compliant storage system.

27. The method according to claim 15, wherein the storage platform is configurable to be used in a data lake architecture to provide a privacy-compliant storage platform.

28. The method according to claim 15, wherein the storage platform is configurable to replace a traditional storage platform including at least one of a Simple Storage Service (S3) or an object storage platform used in an organization.

* * * * *